United States Patent
George et al.

(10) Patent No.: US 10,853,014 B2
(45) Date of Patent: Dec. 1, 2020

(54) HEAD WEARABLE DEVICE, SYSTEM, AND METHOD

(71) Applicant: Rockwell Collins, Inc., Cedar Rapids, IA (US)

(72) Inventors: Christopher L. George, Winchester, VA (US); Emily M. Flaherty-Woods, Cedar Rapids, IA (US); Geoffrey A. Shapiro, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 224 days.

(21) Appl. No.: 15/955,062

(22) Filed: Apr. 17, 2018

(65) Prior Publication Data

US 2019/0317718 A1    Oct. 17, 2019

(51) Int. Cl.
| | |
|---|---|
| G06F 3/14 | (2006.01) |
| G06F 3/01 | (2006.01) |
| G06T 19/00 | (2011.01) |
| G06F 3/16 | (2006.01) |
| B64D 43/02 | (2006.01) |
| G06F 3/0484 | (2013.01) |

(52) U.S. Cl.
CPC .......... G06F 3/1423 (2013.01); G06F 3/012 (2013.01); G06F 3/013 (2013.01); G06F 3/167 (2013.01); G06T 19/006 (2013.01); B64D 43/02 (2013.01); G06F 3/04842 (2013.01)

(58) Field of Classification Search
None
See application file for complete search history.

(56) References Cited

U.S. PATENT DOCUMENTS

| | | | |
|---|---|---|---|
| 5,726,916 A | 3/1998 | Smyth | |
| 7,840,066 B1 | 11/2010 | Chen et al. | |
| 8,154,473 B2 * | 4/2012 | Engel | G09G 5/14 |
| | | | 345/4 |
| 8,497,784 B1 | 7/2013 | Vandrovec | |
| 9,111,498 B2 | 8/2015 | Border et al. | |
| 9,221,396 B1 | 12/2015 | Zhu et al. | |
| 9,347,793 B2 | 5/2016 | Meeker et al. | |
| 9,648,313 B1 | 5/2017 | Henry et al. | |
| 9,892,489 B1 | 2/2018 | Roggendorf et al. | |

(Continued)

FOREIGN PATENT DOCUMENTS

WO    9830981 A1    7/1998

OTHER PUBLICATIONS

PEW, NASA's Head-Worn Display, Mar. 14, 2012, 1 page.
(Continued)

*Primary Examiner* — Brian M Butcher
(74) *Attorney, Agent, or Firm* — Suiter Swantz pc llo

(57) ABSTRACT

A head wearable device, a method, and a system. The head wearable device may include a transparent display and a non-transparent display. The transparent display may be implemented in or on the head wearable device. The transparent display may be configured to present first content to a user of the head wearable device. The non-transparent display may be implemented in or on the head wearable device. The non-transparent display may be configured to present second content to the user of the head wearable device. The non-transparent display may be viewable at least in part through the transparent display.

22 Claims, 13 Drawing Sheets

(56) References Cited

U.S. PATENT DOCUMENTS

| | | |
|---|---|---|
| 2003/0127557 A1 | 7/2003 | Anderson et al. |
| 2003/0227460 A1 | 12/2003 | Schinnerer |
| 2003/0232649 A1 | 12/2003 | Gizis et al. |
| 2004/0044152 A1 | 3/2004 | Matyjaszewski et al. |
| 2004/0075741 A1 | 4/2004 | Berkey et al. |
| 2004/0169617 A1 | 9/2004 | Yelton et al. |
| 2005/0264529 A1 | 12/2005 | Morgan et al. |
| 2009/0228224 A1 | 9/2009 | Spanier et al. |
| 2010/0026525 A1 | 2/2010 | Feyereisen et al. |
| 2011/0022291 A1 | 1/2011 | He |
| 2012/0081519 A1 | 4/2012 | Goma et al. |
| 2012/0120070 A1 | 5/2012 | Baillot |
| 2014/0267270 A1 | 9/2014 | Pappoppula et al. |
| 2014/0361956 A1 | 12/2014 | Mikhailov et al. |
| 2016/0019808 A1 | 1/2016 | Chavez et al. |
| 2016/0066000 A1 | 3/2016 | Cunningham et al. |
| 2016/0132131 A1* | 5/2016 | Han .................. G06F 3/012 345/8 |
| 2017/0287439 A1* | 10/2017 | Fujita .............. G09G 3/3406 |
| 2017/0301288 A1* | 10/2017 | Perdices-Gonzalez ............ G09G 3/2092 |
| 2017/0309215 A1* | 10/2017 | Perdices-Gonzalez ............ G09G 3/2003 |
| 2017/0310940 A1* | 10/2017 | Perdices-Gonzalez ............ G09G 3/2096 |
| 2017/0310956 A1* | 10/2017 | Perdices-Gonzalez ............ G09G 3/3208 |
| 2018/0096642 A1* | 4/2018 | Vishakantaiah ...... G06F 1/1654 |
| 2018/0158385 A1* | 6/2018 | Reichow ............ G06F 3/04842 |
| 2018/0196495 A1* | 7/2018 | Wang .................. G06F 1/3206 |
| 2018/0259782 A1* | 9/2018 | Newton ................ G09G 3/003 |
| 2018/0268568 A1* | 9/2018 | Kim-Whitty ............ G06T 7/90 |

OTHER PUBLICATIONS

Vuzix, Star 1200XLD See-Through AR Eyewear System, www.vuzix.com/augmented-reality/products_star1200xld.html, retrieved on Aug. 12, 2013, 4 pages.

* cited by examiner

HEAD WEARABLE DEVICE, SYSTEM, AND METHOD

CROSS-REFERENCE TO RELATED APPLICATIONS

The present application is related to U.S. patent application Ser. No. 15/891,190, filed on Feb. 7, 2018, to U.S. patent application Ser. No. 14/861,716, filed on Sep. 22, 2015, and to U.S. patent application Ser. No. 14/474,778, filed on Sep. 2, 2014, issued as U.S. Pat. No. 9,773,334 on Sep. 26, 2017, which are hereby expressly incorporated herein in their entirety.

BACKGROUND

Augmented reality may be defined as computer generated imagery overlaid on the real world to supplement the real world view with virtual information. Virtual reality may be defined as a three-dimensional, computer generated environment, which defines a virtual view. Virtual reality displays are not transmissive and as such block natural vision of the environment. Some existing head worn displays use either augmented reality or virtual reality technologies to assist pilots in various tasks, such as navigation, situational awareness, and training. However, currently available augmented reality devices and virtual reality devices are notably different, with each having benefits and limitations, and currently available augmented reality devices and virtual reality devices serve different applications.

Traditional augmented reality head wearable devices use a transparent lens to project computer generated imagery into the pilot's field of view without blocking the pilot's view of the real world. Within the aviation industry, augmented reality head wearable devices enhance head-up and eyes-out operations, increasing pilot's situational awareness while decreasing workload. Augmented reality head wearable devices are generally accepted by pilots for use in flight because pilots are able to see virtual content without blocking their view of the physical environment. However, augmented reality head wearable devices are limited in their rendering capabilities, display brightness, displayable colors due to interference with ambient light, and field of view of the optical rendering environment. Additionally, the augmented reality head wearable devices encounter problems when trying to render virtual objects with real world objects.

Virtual reality head wearable devices completely block the pilot's view of the real world and replace the pilot's view with a computer generated environment. Virtual reality head wearable devices have a wider optical field of view than augmented reality head wearable devices and enable pilots to interact with the virtual world through motion tracking. Virtual reality head wearable devices are currently being used for simulation and training; however, it is anticipated that virtual reality head wearable devices would be rejected by pilots for use in visual flight because the virtual reality displays completely block the pilot's natural view of the real world.

SUMMARY

In one aspect, embodiments of the inventive concepts disclosed herein are directed to a head wearable device. The head wearable device may include a transparent display and a non-transparent display. The transparent display may be implemented in or on the head wearable device. The transparent display may be configured to present first content to a user of the head wearable device. The non-transparent display may be implemented in or on the head wearable device. The non-transparent display may be configured to present second content to the user of the head wearable device. The non-transparent display may be viewable at least in part through the transparent display.

In a further aspect, embodiments of the inventive concepts disclosed herein are directed to a method. The method may include displaying, by a transparent display implemented in or on a head wearable device, first content to a user of the head wearable device. The method may also include displaying, by a non-transparent display implemented in or on the head wearable device, second content to the user of the head wearable device, wherein the non-transparent display is viewable at least in part through the transparent display.

In a further aspect, embodiments of the inventive concepts disclosed herein are directed to a system. The system may include a computing device and a head wearable device. The computing device may include a processor. The head wearable device may be communicatively coupled to the computing device. The head wearable device may include a transparent display and a non-transparent display. The transparent display may be implemented in or on the head wearable device. The transparent display may be configured to present first content to a user of the head wearable device. The non-transparent display may be implemented in or on the head wearable device. The non-transparent display may be configured to present second content to the user of the head wearable device. The non-transparent display may be viewable at least in part through the transparent display.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
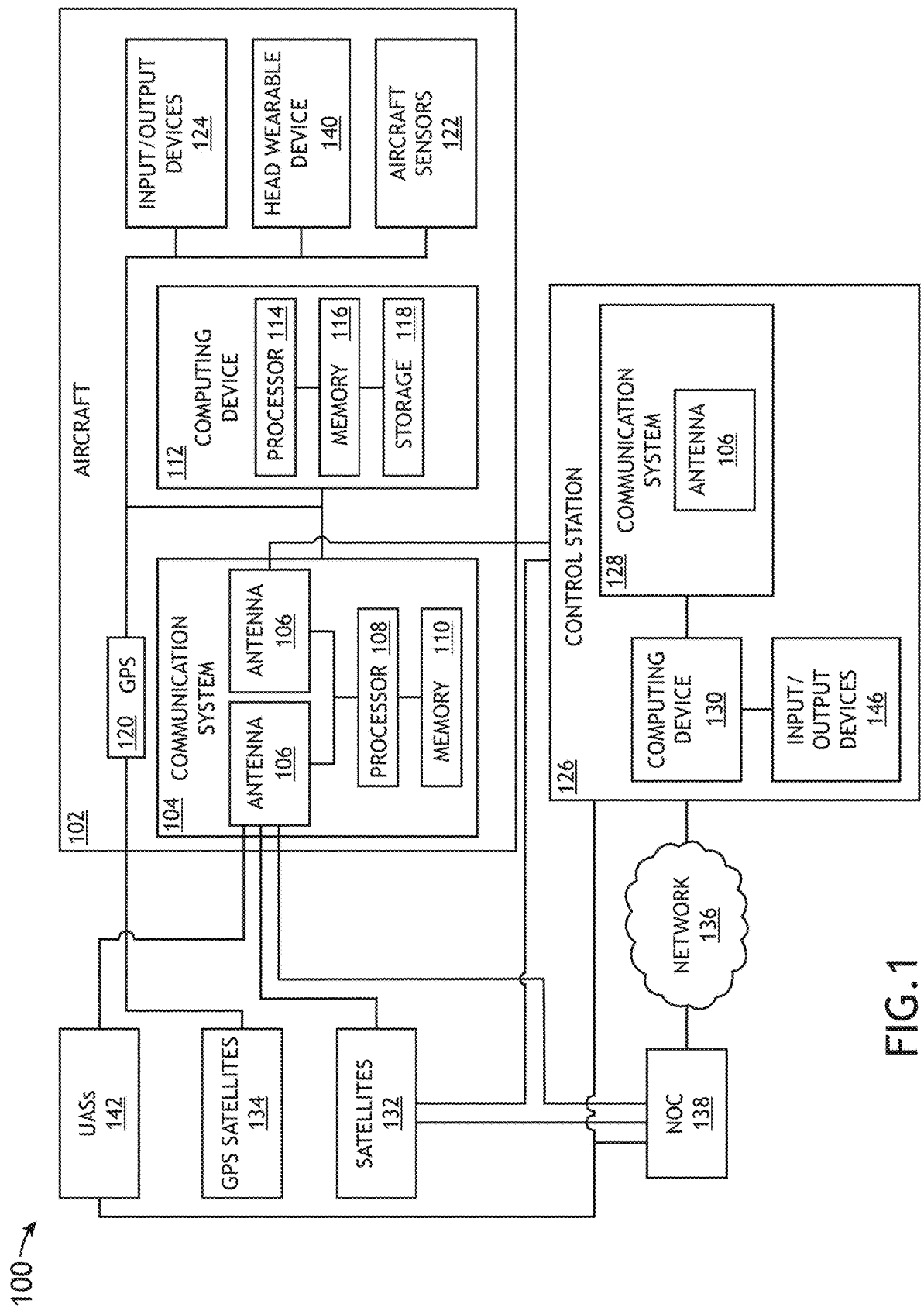
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method, system, and head wearable device. For example, the head wearable device may include at least one transparent display, at least one non-transparent display, at least one processor, at least one camera, and a head tracking system. For example, the at least one transparent display may be implemented as at least one augmented reality display, and the at least one non-transparent display may be implemented as at least one virtual reality display. The at least one transparent display may be configured to present first content to a user of the head wearable device, and the at least one non-transparent display may be configured to present second content to the user of the head wearable device. For example, the head wearable device may be configured to present augmented reality content, such as based on aircraft sensors (e.g., night vision systems, Lidar sensors, millimeter (MM) wave sensors, and electronically scanned array (ESA) radars) that may be aggregated and presented on a hybrid display.

The at least one non-transparent display may be configured to move relative to the head wearable device between a first position and a second position, such that at least one non-transparent display may be retractable from a field of view of the user of the head wearable device. The head wearable device may be configured to present augmented reality content, virtual reality content, or a combination of augmented and virtual reality content to the user depending on the position of the at least one non-transparent display. When the at least one non-transparent display is in a down position (e.g., such that the user views the at least one non-transparent display in addition to the at least one transparent display), the head wearable device may present graphical images on the fixed transparent display layer and graphical images on the at least one non-transparent display. The retractable nature of the at least one non-transparent display may improve pilot's confidence in adopting technologies that block pilots' natural view completely. Further, the retractable nature of the at least one non-transparent display would enable pilots to fly heads-up and eyes-out using only the at least one transparent display during the majority of a flight, while utilizing both display layers in certain situations, such as when flying an aircraft in a degraded visual environment (e.g., dust, night, clouds, fog, and/or precipitation).

Embodiments of the head wearable device including the at least one transparent display and the at least one non-transparent display have several advantages over either a singular augmented reality head wearable device or a singular virtual reality head wearable device. Embodiments of the head wearable device may leverage the strengths of both augmented reality and virtual reality technology based on an operational scenario. For example, in a clear visual operational environment the augmented reality transparent display layer would augment the pilot's natural vision and allow the pilot to maintain visual operations. In a degraded visual environment, however, the virtual reality non-transparent display layer would provide the pilots with improved situational awareness with a synthetic view of the real world. Embodiments of the head wearable device having dual display layers may enable a strong sense of depth for the user to be drawn into the virtual environment due to the dual-layered augmented and virtual reality displays. Embodiments of the head wearable device having dual display layers may facilitate an intuitive method for decluttering options between the closer (e.g., relative to the eyes of the user) augmented reality display layer and the further virtual reality display layer. Because the displays are projected at a distance, the user does not perceive one display as closer or farther away despite being at a different distance from the user's eyes. As such, the head wearable device can project content at nearly any perceived distance, and the content and information may be layered based on an urgency and conformality (e.g., virtual terrain may be overlaid over real terrain). Layering the information and content allows the user's view to be decluttered. For example, high priority information could be augmented on the closer synthetic transparent display layer with lower priority information augmented on the further virtual reality display layer. Then the displays could be easily decluttered through retraction of the VR display layer or through user inputs (e.g., gestures, button presses, or voice commands). Additionally, embodiments of the head wearable device having dual display layers may enable a method for information to be presented to a pilot, by utilizing predetermined priority, where highly prioritized messages and virtual content may be presented on the closer augmented reality transparent display layer and lower priority content may be presented on the farther non-transparent display layer. Further, embodiments of the head wearable device having dual display layers may incorporate the use of enhanced camera video into the content displayed on the display layers when in a degraded visual environment, which could provide pilots with better situational awareness than would be available using natural vision and a single AR display.

In some embodiments, the head wearable device having dual display layers may be used in manned-unmanned teaming (MUM-T) applications. For example, the retractable virtual reality display layer could be used by a pilot-in-command to enter a virtual scene of the unmanned team member (e.g., an unmanned aerial system) and quickly return to normal operation by retracting the virtual reality display layer.

In some embodiments, the head wearable device having dual display layers may be used in traditional rotary wing applications. For example, a pilot may easily flip down the virtual reality display layer when in a degraded visual environment to display a synthetic view and retract the virtual reality display layer in clear conditions.

Referring now to FIG. 1, an exemplary embodiment of a system 100 according to the inventive concepts disclosed herein includes at least one aircraft 102, a control station 126, satellites 132, global positioning system (GPS) satellites 134, a network 136, a network operations center (NOC) 138, and UASs 142. Some or all of the aircraft 102, the control station 126, the satellites 132, the GPS satellites 134, the network 136, the NOC 138, and the UASs 142 may be communicatively coupled at any given time.

The aircraft 102 includes at least one communication system 104, a plurality of computing devices 112 (which may also be referred to as aircraft computing devices, helicopter computing devices, or vehicular computing devices as may be appropriate), a GPS device 120, aircraft sensors 122, input/output devices 124, and at least one head wearable device 140, as well as other systems, equipment, and devices commonly included in aircraft. Some or all of the communication system 104, the computing devices 112, the GPS device 120, the aircraft sensors 122, the input/ output devices 124, the head wearable device 140, and any other systems, equipment, and devices commonly included in the aircraft 102 may be communicatively coupled. While not shown, in some embodiments, the aircraft 102 may optionally include a NOC or include components (e.g., at least one computing device 112 and/or the communication system 104) configured to perform functionality similar to the NOC 138. The aircraft 102 may be implemented as any suitable aircraft, such as a helicopter or airplane. The aircraft 102 may be a manned aircraft. While the system 100 is exemplarily shown as including the aircraft 102, in some embodiments the inventive concepts disclosed herein may be implemented in or on any suitable vehicle (e.g., an automobile, train, submersible craft, watercraft, or spacecraft) or in any suitable environment.

The communication system 104 includes one or more antennas 106 (e.g., two antennas 106, as shown), a processor 108, and memory 110, which are communicatively coupled. The communication system 104 (such as via one or more of the antennas 106) is configured to send and/or receive signals, data, messages, and/or voice transmissions to and/or from the control station 126, other vehicles (e.g., the UASs 142), the satellites 132, the NOC 138, and combinations thereof, as well as any other suitable devices, equipment, or systems. That is, the communication system 104 is configured to exchange (e.g., bi-directionally exchange) signals, data, messages, and/or voice communications with any other suitable communication system (e.g., which may be implemented similarly and function similarly to the communication system 104). Additionally, for example, the communication system 104 may be configured to exchange, send, and/or receive (e.g., via a wireless connection, a cabled connection, and/or a wired connection, or a combination thereof) signals, data, messages, and/or voice communications with, to, and/or from any suitable onboard device(s).

The communication system 104 may include at least one processor 108 configured to run or execute various software applications, computer code, and/or instructions stored (e.g., maintained) in at least one non-transitory computer-readable medium (e.g., at least one computer-readable medium implemented as hardware; e.g., at least one non-transitory processor-readable medium, at least one memory 110 (e.g., at least one nonvolatile memory, at least one volatile memory, or a combination thereof; e.g., at least one random-access memory, at least one flash memory, at least one read-only memory (ROM) (e.g., at least one electrically erasable programmable ROM (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

Some or all of the at least one computer-readable medium may be communicatively coupled. For example, the processor 108 may be configured to receive data from the computing devices 112 and/or the head wearable device 140 and execute instructions configured to cause a particular antenna of the antennas 106 to transmit the data as a signal(s) to the UASs 142 and/or another communication system (e.g., 128) of the system 100. Likewise, for example, the processor 108 may be configured to route data received as a signal(s) by a particular antenna of the antennas 106 to one or more of the computing devices 112 and the head wearable device 140. In some embodiments, the processor 108 may be implemented as one or more radiofrequency (RF) processors.

Each of the antennas 106 may be implemented as or may include any suitable antenna or antenna device. For example, the antennas 106 may be implemented as or include at least one electronically scanned array (ESA) (e.g., at least one active ESA (AESA)), at least one radio (e.g., at least one software defined radio (SDR)), at least one transmitter, at least one receiver, at least one transceiver, or a combination thereof.

While the communication system 104 is shown as having two antennas 106, one processor 108, and memory 110, the communication system 104 may include any suitable number of antennas 106, processors 108, and memory 110. Further, the communication system 104 may include other components, such as a storage device (e.g., solid state drive or hard disk drive), radio tuners, and controllers.

Each of the computing devices 112 of the aircraft 102 may include at least one processor 114, memory 116, and storage 118, as well as other components, equipment, and/or devices commonly included in a computing device, all of which may be communicatively coupled to one another. Each of the computing devices 112 may be configured to route data to each other as well as to the head wearable device 140 and/or the communication system 104 for transmission to an off-board destination (e.g., satellites 132, NOC 138, control station 126, and/or UASs 142). Likewise, each computing device 112 may be configured to receive data from another computing device 112 as well as from the head wearable device 140 and/or the communication system 104 transmitted from off-board sources (e.g., satellites 132, NOC 138, control station 126). The computing device 112 may include or may be implemented as and/or be configured to perform the functionality of any suitable aircraft system, such as an engine indication and crew alerting system (EICAS) computing device (e.g., 112-2), a flight management system (FMS) computing device (e.g., 112-3), an integrated flight information system (IFIS) computing device (e.g., 112-4), an information management system (IMS) computing device (e.g., 112-5), an onboard maintenance system (OMS) computing device (e.g., 112-6), and a terrain awareness and warning system (TAWS) computing device (e.g., 112-7). (See, e.g., FIG. 8.) The processor 114 may be configured to run various software applications or computer code stored (e.g., maintained) in a non-transitory computer-readable medium (e.g., memory 116 or storage 118) and configured to execute various instructions or operations. Additionally, for example, the computing devices 112 or the processors 114 may be implemented as special purpose computers or special purpose processors configured (e.g., programmed) to execute instructions for performing any or all of the operations disclosed throughout. In some embodiments, the aircraft 102 may include any suitable number of computing devices 112.

In some embodiments, one of the computing devices 112 may be configured to receive position and orientation data (e.g., a stream of position and orientation data) from the head wearable device 140, wherein the position and orientation data is indicative of a position and orientation of the user's head. For example, the computing device 112 may be configured to receive position and orientation data from the head tracking system 408 of the head wearable device 140. Based at least on the position and orientation data, the processor 114 may be configured to generate a virtual image (e.g., a virtual scene image) corresponding to a field of view of the wearer of the head wearable device 102. The processor may be configured to output the virtual image as virtual image data to the head wearable device 140. The processor 114 may be configured to generate a stream of virtual images and output the stream of virtual images as a stream of virtual image data to the head wearable device 140.

The GPS device 120 receives location data from the GPS satellites 134 and may provide vehicular location data (e.g., aircraft location data) to any of various equipment/systems of the aircraft 102 (e.g., the communication system 104, the computing devices 112, the aircraft sensors 122, the input/output devices 124, and the head wearable device 140). The GPS device 120 may include a GPS receiver and a processor. For example, the GPS device 120 may receive or calculate location data from a sufficient number (e.g., at least four) of GPS satellites 134 in view of the aircraft 102 such that a GPS solution may be calculated. In some embodiments, the GPS device 120 may be implemented as or as part of a computing device 112, the communication system 104, navigation sensors of the aircraft sensors 122, and/or one of the input/output devices 124. The GPS device 120 may be configured to provide the location data to any of various equipment/systems of a vehicle. For example, the GPS device 120 may provide location data to the computing devices 112, the communication system 104, head wearable device 140, and the input/output devices 124. Further, while FIG. 1 depicts the GPS device 120 implemented in the aircraft 102, in other embodiments, the GPS device 120 may be implemented in or on any type of vehicle, such as automobiles, spacecraft, trains, watercraft, or submersible craft.

While the communication system 104, the computing devices 112, the GPS device 120, the aircraft sensors 122, the input/output devices 124, and the head wearable device 140 of the aircraft 102 have been exemplarily depicted as being implemented as separate devices or systems, in some embodiments, some or all of the communication system 104, the computing devices 112, the GPS device 120, the aircraft sensors 122, and/or the input/output devices 124 may be implemented as a single integrated system or device or as any number of integrated and/or partially integrated systems and/or devices.

The control station 126 may include at least one communication system 128, at least one computing device 130, and input/output devices 146, as well as other systems, equipment, and devices commonly included in a control station. Some or all of the communication system 128, the computing device 130, the input/output devices 146, and other systems, equipment, and devices commonly included in a control station may be communicatively coupled. The control station 126 may be implemented as a fixed location ground control station (e.g., a ground control station of an air traffic control tower, or a ground control station of a network operations center (e.g., 138)) located on the ground of the earth. In some embodiments, the control station 126 may be implemented as a mobile ground control station (e.g., a ground control station implemented on a non-airborne vehicle (e.g., an automobile or a ship) or a trailer). In some embodiments, the control station 126 may be implemented as an air control station implemented on an airborne vehicle (e.g., aircraft). The control station 126 may include a NOC or be communicatively coupled to the NOC 138 (e.g., via the network 136).

The communication system 128 and components thereof (such as antenna 106) of the control station 126 may be implemented similarly to the communication system 104 except that, in some embodiments, the communication system 128 may be configured for operation at a fixed location.

The computing device 130 and components thereof (such as a processor (not shown) and memory (not shown)) of the control station 126 may be implemented similarly to the computing devices 112. The input/output devices 146 may be implemented similarly to input/output devices 124 except that, in some embodiments, the input/output devices 146 may be configured for operation at a fixed location.

While the antennas 106 are exemplarily depicted as being implemented in the aircraft 102 and the control station 126, in some embodiments, antennas 106 may be implemented in, on, or coupled to any other suitable device, equipment, or system, such as the UASs 142, a computing device (e.g., a laptop computing device, a mobile computing, a wearable computing device, or a smart phone), a mobile communication system (e.g., a man pack communication system), or satellites 132.

The network 136 may be implemented as any suitable network or combination of networks. For example, the network 136 may include or be implemented as the internet, a portion of the internet (such as a secured optical fiber network), an intranet, a wide area network (WAN), a local area network (LAN), and/or a mobile telecommunications network (e.g., a third generation (3G) network or a fourth generation (4G) network)). While the system 100 is exemplarily shown as including the network 136, the system 100 or various components of the system 100 may include or be communicatively coupled via any suitable number and any suitable types of networks.

The NOC 138 may connect a particular type of communications (e.g., satellite communications with the satellites 132 and/or aircraft communications with the aircraft 102 and/or the UASs 142) with the network 136.

The UASs 142 may be implemented similarly to the aircraft 102, except that, the UASs are configured for unmanned operation.

While FIG. 1 exemplarily includes elements as shown, in some embodiments, one or more of the elements of the system 100 may be omitted, or the system 100 may include other elements. For example, one or more of the GPS satellites 134, satellites 132, the control station 126, the network 136, the NOC 138, or the UASs 142 may be optional. Additionally, while an embodiment has been depicted as including one control station (e.g., the control station 126), other embodiments may include any number of control stations of various types positioned or moving anywhere in the system 100.

Figure 2:
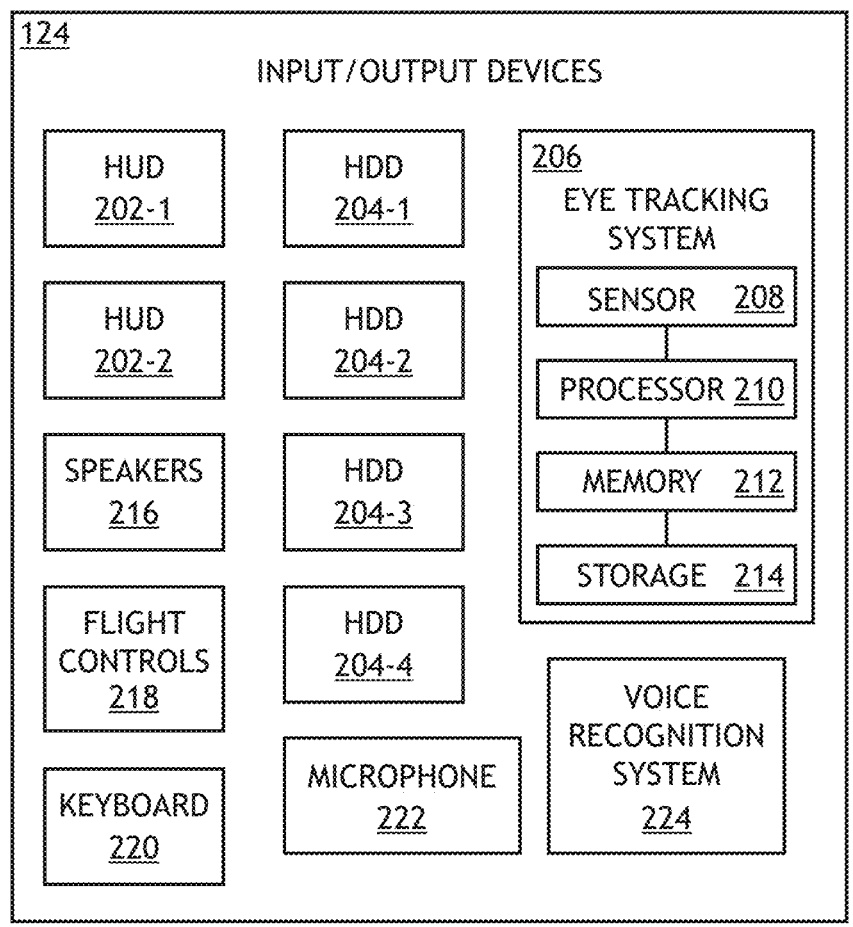
FIG. 2 is a view of the input/output devices of the aircraft of FIG. 1 according to the inventive concepts disclosed herein.

Referring now to FIG. 2, the input/output devices 124 of the aircraft 102 of FIG. 1 may include one or more displays (e.g., at least one head-up display (HUD), at least one HDD, at least one adaptive flight display (AFD), or a combination thereof), at least one eye tracking system 206, speakers 216, flight controls 218, at least one keyboard 220, at least one microphone 222, at least one voice recognition system 224, or a combination thereof, some or all of which may be communicatively coupled at any given time. While FIG. 2 depicts the various exemplary input/output devices 124, the input/output devices 124 may include any suitable input/output devices.

For example, the displays of the input/output devices 124 may include two HUDs 202-1, 202-2 (which may collectively be referred to as HUDs 202) and four HDDs 204-1, 204-2, 204-3, 204-4 (which may collectively be referred to as HDDs 204). Each of the HUDs 202 and the HDDs 204 may be configured to present streams of images (e.g., as video or still images) to a user (e.g., a pilot or an operator). In some embodiments, the HUDs 202 and/or HDDs 204 may be implemented as or include a touchscreen display. In some embodiments, one or more of the HUDs 202 and the HDDs 204 may include an integrated computing device (which may be implemented and function similarly to one of the computing devices 112 of FIG. 1) and/or integrated computing device components (which may be implemented and function similarly to components of one of the computing devices 112 of FIG. 1). Each of the HUDs 202 and the HDDs 204 may be communicatively coupled to one or more of the computing devices 112, the communication system 104, the GPS device 120, the head wearable device 140, other of the input/output devices 124, and/or the aircraft sensors 122 of FIG. 1.

The eye tracking system 206 is configured to track eye gestures, track movement of a user's eye, track a user's gaze, and/or otherwise receive inputs from a user's eyes. The eye tracking system 206 may be configured for performing fully automatic eye tracking operations of users in real time. The eye tracking system 206 may include at least one sensor 208, at least one processor 210, a memory 212, and a storage 214, as well as other components, equipment, and/or devices commonly included in an eye tracking system. The sensor 208, the processor 210, the memory 212, and the storage 214, as well as the other components, equipment, and/or devices commonly included in the eye tracking system 206 may be communicatively coupled.

Each sensor 208 may be implemented as any of various sensors suitable for an eye tracking system. For example, the at least one sensor 208 may include or be implemented as one or more optical sensors (e.g., at least one camera configured to capture images in the visible light spectrum and/or the infrared spectrum). In some embodiments, the at least one sensor 208 is one or more dedicated eye tracking system sensors. While the sensor 208 has been exemplarily depicted as being included in the eye tracking system 206, in some embodiments, the sensor 208 may be implemented external to the eye tracking system 206. For example, the sensor 208 may be implemented as an optical sensor (e.g., of the optical sensors 316 of the aircraft sensors 122) located within the aircraft 102 and communicatively coupled to the processor 210.

The processor 210 may be configured to process data received from the sensor 208 and output processed data to one or more onboard devices or onboard systems (e.g., the communication system 104, the computing devices 112, the aircraft sensors 122, other of the input/output devices 124, the head wearable device 140, or a combination thereof). For example, the processor 210 may be configured to generate eye tracking data and output the generated eye tracking data to one of the computing devices 112 and/or the head wearable device 140. The processor 210 of the eye tracking system 206 may be configured to run various software applications or computer code stored (e.g., maintained) in a non-transitory computer-readable medium (e.g., memory 212 and/or storage 214) and configured to execute various instructions or operations. The processor 210 may be implemented as a special purpose processor configured to execute instructions for performing any or all of the operations disclosed throughout.

Figure 4:
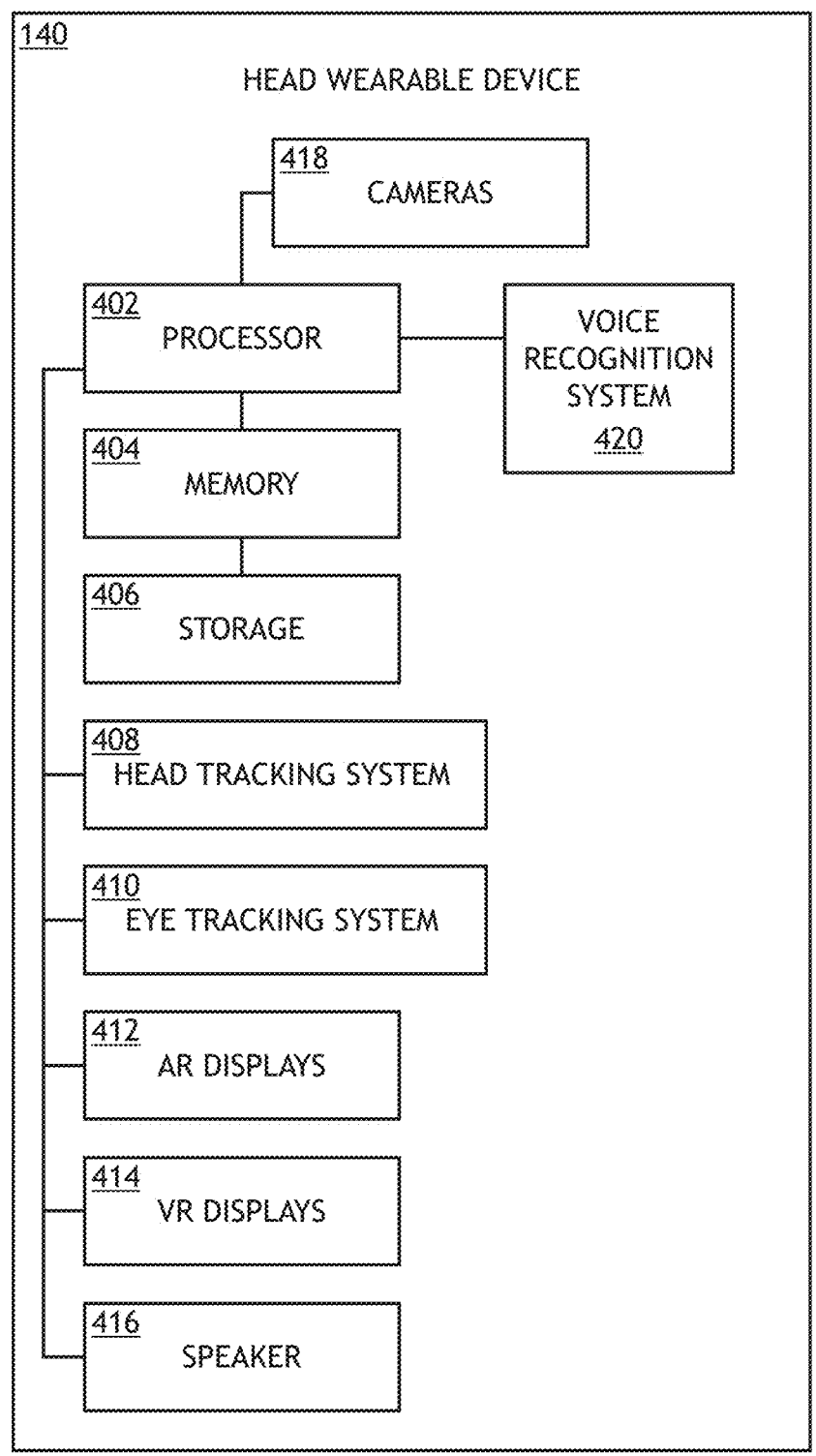
FIG. 4 is a view of the head wearable device of the aircraft of FIG. 1 according to the inventive concepts disclosed herein.
Figure 7:
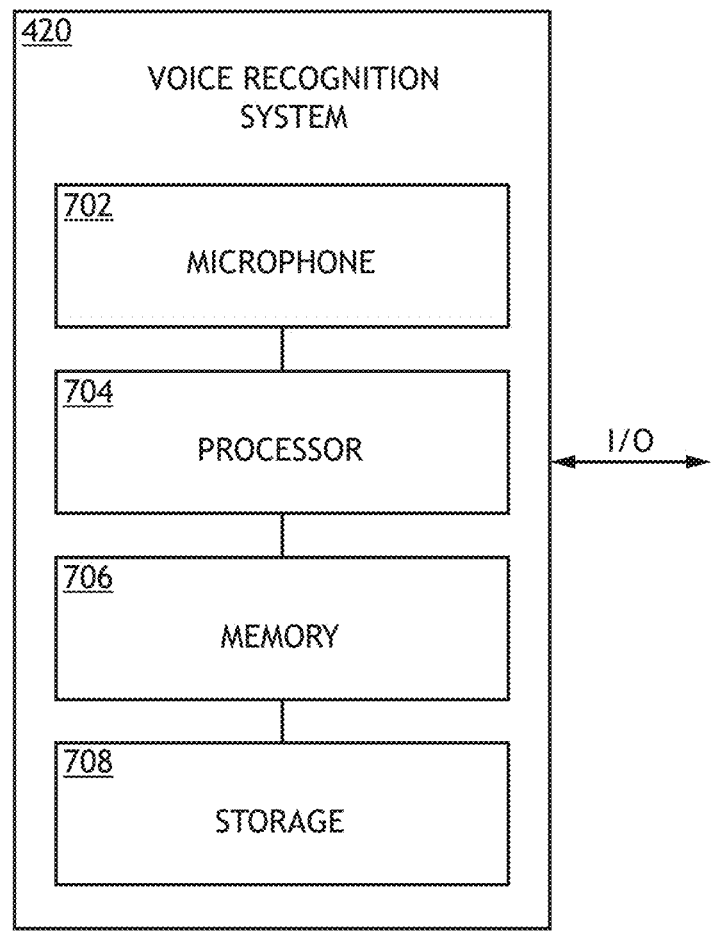
FIG. 7 is a view of the voice recognition system of the head wearable device of FIG. 4 according to the inventive concepts disclosed herein.

The voice recognition system 224 may be implemented similarly to the voice recognition system 418 shown in and described with respect to FIGS. 4 and 7.

In some embodiments, some or all of the input/output devices 124 may include an integrated computing device (which may be implemented and function similarly to one of the computing devices 112 of FIG. 1) and/or integrated computing device components (which may be implemented and function similarly to components of one of the computing devices 112 of FIG. 1).

Figure 3:
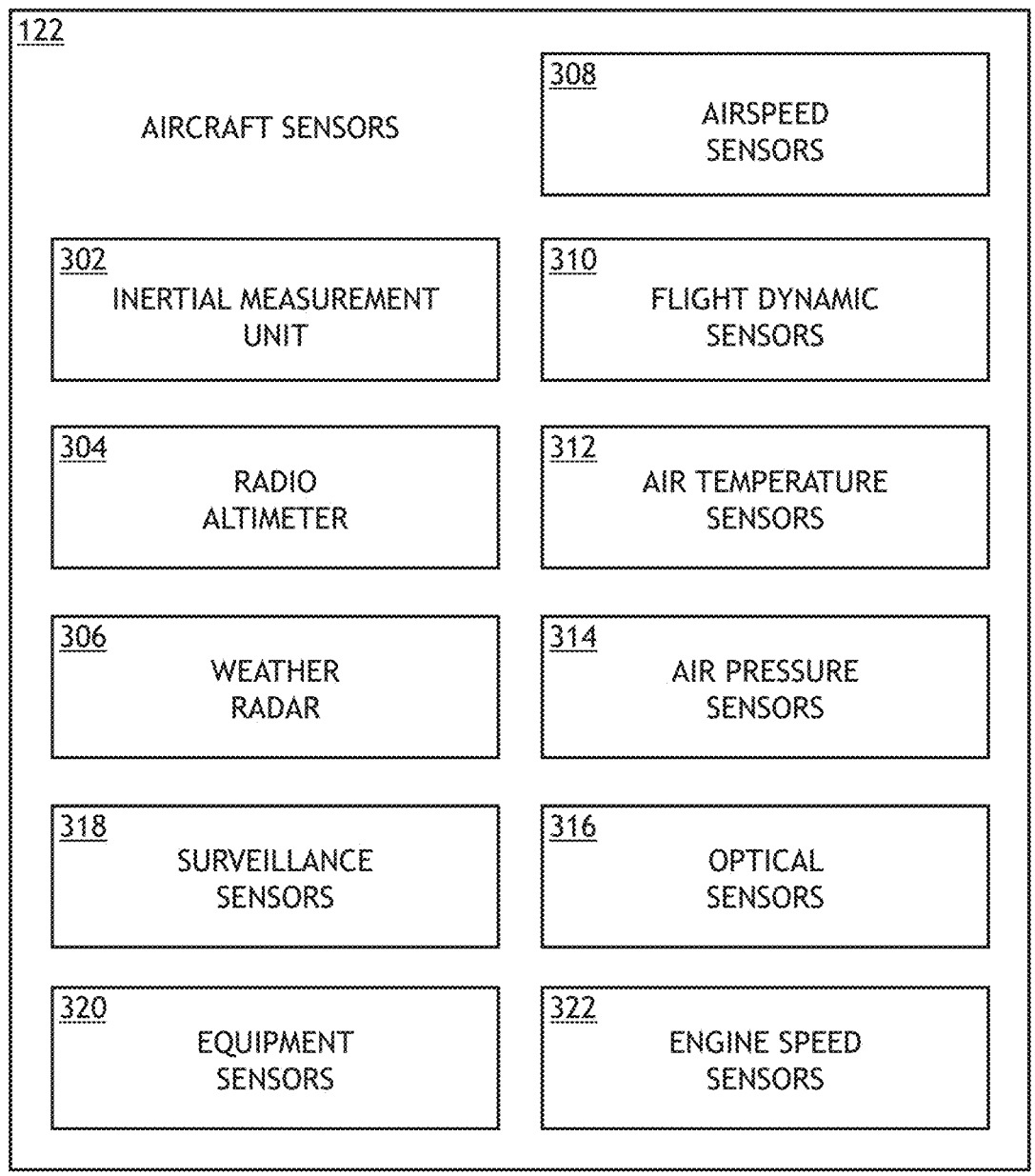
FIG. 3 is a view of the aircraft sensors of the aircraft of FIG. 1 according to the inventive concepts disclosed herein.

Referring now to FIG. 3, the aircraft sensors 122 of FIG. 1 are shown. Each of the aircraft sensors 122 may be configured to sense a particular condition(s) external to the aircraft 102 or within the aircraft 102 and output data associated with particular sensed condition(s) to one or more onboard devices or onboard systems (e.g., the communication system 104, the computing devices 112, the aircraft sensors 122, the input/output devices 124, the head wearable device 140, or a combination thereof). For example, the aircraft sensors 122 may include an inertial measurement unit 302, a radio altimeter 304, radar (e.g., weather 306, surveillance radar, and/or weapon radar), airspeed sensors 308, flight dynamic sensors 310 (e.g., configured to sense acceleration, pitch, roll, and/or yaw; e.g., one or more accelerometers), air temperature sensors 312, air pressure sensors 314, optical sensors 316 (e.g., cameras configured to capture images in the visible light spectrum and/or the infrared spectrum, such as forward looking infrared (FLIR) cameras and/or short-wavelength infrared (SWIR) cameras), sound ranging sensors (not shown), surveillance sensors 318, equipment sensors 320 (e.g., electrical system sensors, hydraulic system sensors, bleed air sensors, environmental conditioning sensors, fuel sensors, and/or fire warning/suppression sensors), and/or engine speed sensors 322, some or all of which may be communicatively coupled at any given time. Additionally, the GPS device 120 may be considered as one of the aircraft sensors 122.

For example, at least some of the aircraft sensors 122 may be implemented as navigation sensors (e.g., the GPS device 120, the inertial measurement unit 302, a radio altimeter 304, weather radar 306, airspeed sensors 308, flight dynamic sensors 310, air temperature sensors 312, and/or air pressure sensors 314) configured to sense any of various flight conditions or aircraft conditions typically used by aircraft and output navigation data (e.g., aircraft location data, aircraft orientation data, aircraft direction data, aircraft speed data, and/or aircraft acceleration data). For example, various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft roll, aircraft yaw, air temperature, and/or air pressure. For example, the GPS device 120 and the inertial measurement unit 302 may provide aircraft location data and aircraft orientation data, respectively, to a processor (e.g., a processor of the GPS device 120, processor 114, processor 114-1, processor 108, processor 210, processor 402, or a combination thereof).

In some embodiments, some or all of the aircraft sensors 122 may include an integrated computing device (which may be implemented and function similarly to one of the computing devices 112 of FIG. 1) and/or integrated computing device components (which may be implemented and function similarly to components of one of the computing devices 112 of FIG. 1).

Further, while the aircraft sensors 122 are implemented in or on the aircraft 102, some embodiments may include vehicle sensors implemented on any suitable vehicle according to the inventive concepts disclosed herein.

Referring now to FIGS. 4-7, an exemplary embodiment of the head wearable device 140 according to the inventive concepts disclosed herein is shown. The head wearable device 140 may be implemented as a hybrid augmented reality and virtual reality head wearable device. The head wearable device 140 may be configured to present augmented reality and/or virtual reality scene images to the wearer of the head wearable device 140. The head wearable device 140 may include at least one processor 402, at least one memory 404, at least one storage device 406, a head tracking system 408, a user input system (e.g., an eye tracking system 410 and/or a voice recognition system 420), at least one transparent display (e.g., augmented reality displays 412), at least one non-transparent display (e.g., virtual reality displays 414), at least one speaker 416, and at least one camera (e.g., cameras 418), some or all of which may be communicatively coupled.

The head wearable device 140 may be configured to generate and/or receive streams of image data (e.g., augmented reality image data and/or virtual reality image data), such as from one of the computing devices 112. The streams of image data may be output to the augmented reality displays 412 and/or the virtual reality displays 414. For example, the head wearable device 140 may be configured to provide a wearer of the head wearable device 140 with an augmented and/or virtual reality experience by blending and/or overlaying augmented reality images with and/or on images (e.g., real scene images, sensed images (e.g., formed from sensors (e.g., vision sensors, such as optical sensors 316)), or virtual scene images) to create combined three-dimensional immersive scene images, which are presented to the wearer of the head wearable device 102. Additionally, for example, the head wearable device 140 may be configured to provide a wearer of the head wearable device 140 with a hybrid augmented and virtual reality experience by blending and/or overlaying augmented reality images (e.g., symbology, text, and/or depictions) displayed by the augmented reality displays 412 with and/or on real images or synthetic images displayed by the virtual reality displays 414.

Figure 12:
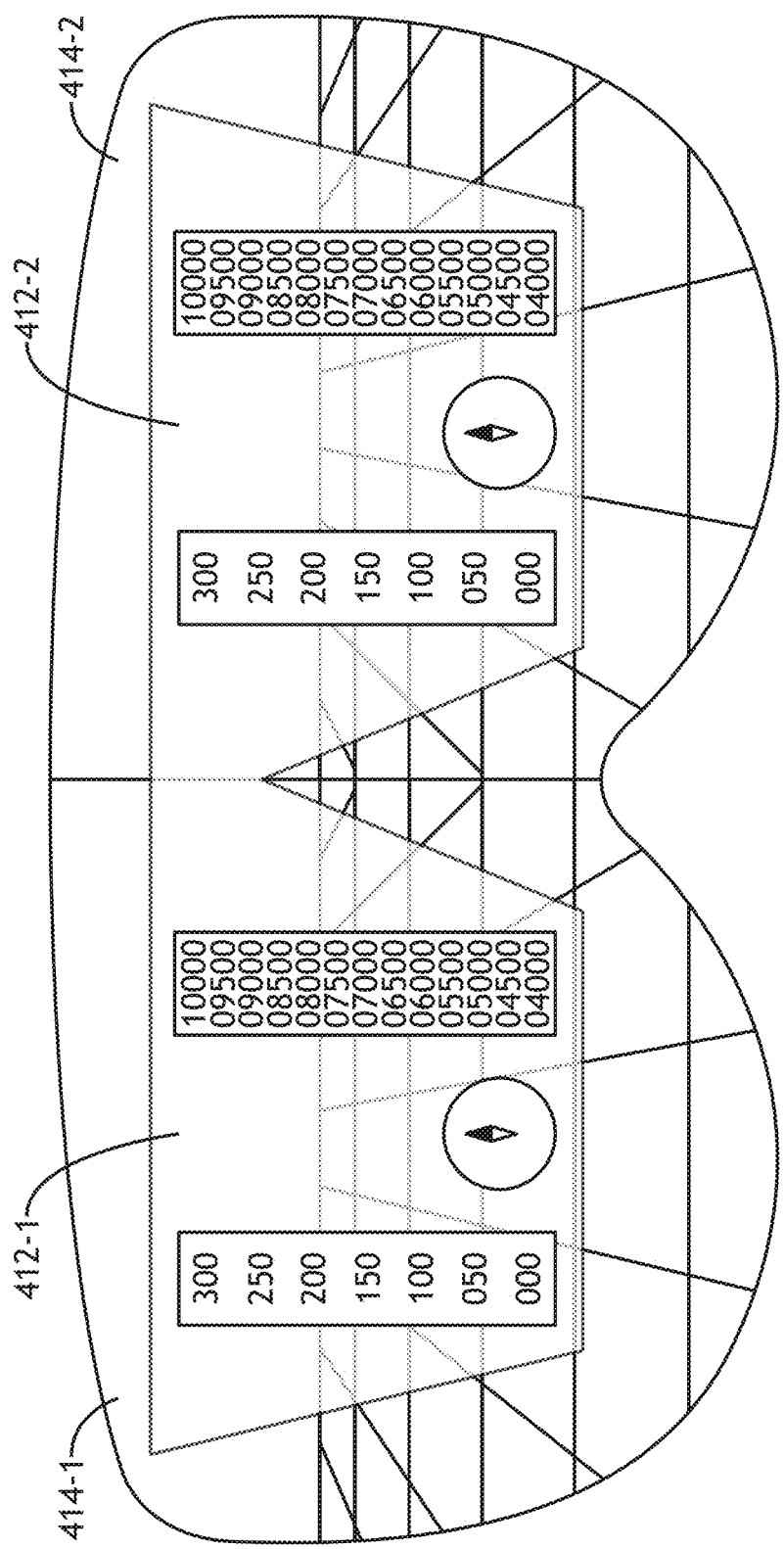
FIG. 12 is a view of the augmented reality displays and the virtual reality displays of the head wearable device of FIGS. 1, 4, and 11 according to the inventive concepts disclosed herein.

The augmented reality displays 412 may be implemented as transparent displays. The augmented reality displays 412 may be considered as transmissive displays in that the augmented reality displays 412 allow light to pass through the augmented reality displays 412. In some embodiments, the augmented reality displays 412 may be fixedly mounted to the head wearable device 140 such that the augmented reality displays 412 are positioned in front of a wearing user's eyes when worn. The augmented reality displays 412 may be configured to receive streams of images as streams of image data and present the streams of images to a wearing user of the head wearable device 140. The user may be able to view the real world through the augmented reality displays 412 or may be able to view the virtual reality displays 414 through the augmented reality displays 412. For example, the augmented reality displays 412 may be configured to overlay graphical images on the user's view of the real world or the virtual reality displays 414. The augmented reality displays 412 may be configured to present any of various content to a user of the head wearable device 140. The augmented reality displays 412 may be configured to present content that is aligned with content presented by the virtual reality displays 414 or aligned with the user's real world view through the augmented reality displays 412. The content displayed by the augmented reality displays 412 may appear to the user as having a perceptible depth as compared to content displayed by the virtual reality displays 414 or the user's real world view through the augmented reality displays 412; for example, content displayed by the augmented reality displays 412 may appear to be in the foreground, whereas the content displayed by the virtual reality displays 414 or the user's real world view may appear to be in the background. The augmented reality displays 412 may include a left augmented reality display (e.g., 412-1, as shown in FIG. 12) and a right augmented reality display (e.g., 412-2, as shown in FIG. 12). The left and right augmented reality displays 412 may be configured to present stereoscopic content to the user. When the augmented reality displays 412 are not active (e.g., not displaying images or not powered), the augmented reality displays 412 may operate as transparent optical elements that allow the user to view the real world or the virtual reality displays 414 through the augmented reality displays 412. While the augmented reality displays 412 are exemplarily described as multiple displays, some embodiments may include a single augmented reality display 412.

The virtual reality displays 414 may be implemented as non-transparent (e.g., opaque) displays. The virtual reality displays 414 may be emissive displays or backlit displays. The virtual reality displays 414 may be configured to receive streams of images as streams of image data and present the streams of images to a wearing user of the head wearable device 140. The user may be able to view the virtual reality displays 414 through the augmented reality displays 412. The virtual reality displays 414 may be configured to present any of various content to a user of the head wearable device 140. For example, the virtual reality displays 414 may be configured to display synthetic images of the real world or virtual world images, such as a virtual view from a perspective of an unmanned vehicle. The virtual reality displays 414 may be configured to present content that is aligned with content presented by the augmented reality displays 412. The content displayed by the virtual reality displays 414 may appear to the user as having a perceptible depth as compared to content displayed by the augmented reality displays 412. The virtual reality displays 414 may include a left virtual reality display (e.g., 414-1, as shown in FIG. 12) and a right virtual reality display (e.g., 414-2, as shown in FIG. 12). The left and right virtual reality displays 414 may be configured to present stereoscopic content to the user. The virtual reality displays 414 may be configured to move relative to the remainder of the head wearable device 140 between a first position and a second position. When the virtual reality displays 414 are in the first position, the augmented reality displays 412 and the virtual reality displays 414 may be configured to simultaneously present aligned content having perceptible depth to the user. When the virtual reality displays 414 are in the first position, the virtual reality displays 414 may be considered to be occluded displays that block light from the real world from being perceived by the user such that the only significant light that the user perceives is from the virtual reality displays 414. When the virtual reality displays 414 are in the second position, the augmented reality displays 412 may be configured to present content to the user while allowing the user to view a real world environment outside of the head wearable device 140 through the augmented reality displays 412. When the virtual reality displays 414 are in the second position, the virtual reality displays 414 may be deactivated (e.g., powered off). While the virtual reality displays 414 are exemplarily described as multiple displays, some embodiments may include a single virtual reality display 414.

The processor 402 may be implemented as any suitable processor, such as a general purpose processor, an image processor, and/or a field-programmable gate array (FPGA). The processor 402 may be configured to receive data from one of the computing devices. For example, the received data may include image data associated with images to be displayed by the augmented reality displays 412 and/or the virtual reality displays 414, and the processor 402 may output streams of image data to the augmented reality displays 412 and/or the virtual reality displays 414. Additionally, for example, the received data may include data from an avionics computing device, and the processor 402 may utilize the received data to generate streams of image data to output to the augmented reality displays 412 and/or the virtual reality displays 414. For example, the processor 402 may be configured to receive data (e.g., image data associated with images (e.g., assets and battlespace features) to be overlaid on a user's field of view and/or overlaid on a virtual image of an environment and/or virtual image data associated with virtual images of an environment) from one of the computing devices 112. Such received data may be aligned with determined position and determined orientation of the head of the user relative to the environment. The processor 402 may be configured to generate graphical images (e.g., symbology, text, and/or depictions), which, for example, may represent teamed assets and battlespace features. Assets may refer to vehicles (manned vehicles and/or unmanned vehicles; e.g., aircraft (e.g., manned aircraft and/or unmanned aerial systems (UASs)), spacecraft, ground vehicles (e.g., automobiles and/or tanks), ships, and/or submarines), soldiers, military installations, and/or bases; likewise, teamed assets may refer to friendly assets. For example, battlespace features may include sensor ranges, weapon ranges, targeting information, landing zones, and/or threat areas. Such generated graphical images may be aligned with determined position and determined orientation of the head of the user relative to the environment. The processor 402 may be configured to output the graphical images to the augmented reality displays 412 and/or the virtual reality displays 414 for presentation to the user.

In some embodiments, the graphical images include augmented reality graphical images that augment a user's real world view on the augmented reality displays 412 (e.g., transparent displays) of the head wearable device 140. In some embodiments, the graphical images include virtual reality graphical images to be displayed on the virtual reality displays 414 (e.g., non-transparent displays) of the head wearable device 140. In some embodiments, the graphical images include augmented reality graphical images to be displayed on the augmented reality displays 412 and virtual reality graphical images to be displayed on the virtual reality displays 414. In some embodiments, the graphical images are overlaid on virtual images to provide an enhanced virtual reality experience for a user wearing the head wearable device 140.

For example, the processor 402 of the head wearable device 140 may generate virtual scene images to be displayed by the virtual reality displays 414, and the processor 402 of the head wearable device 140 may generate symbology and output the symbology to the augmented reality displays 412, where the symbology is displayed by the augmented reality displays 412 and laid over a location of real entities in a battlespace environment as depicted by the virtual reality displays 414. For example, the symbology may indicate the location of friendly, enemy, neutral, or unknown battlespace entities. Additionally, the symbology may illustrate entities' sensor and weapons ranges, targeting information, weather, landing zones, threat areas, and other battlespace features. Further, the processor 402 may generate virtual content, such as such as menus related to asset status, tasks, and capabilities, and output such virtual content to the augmented reality displays 412 and/or the virtual reality displays 414 based on mission context. Additionally, for example, the processor 402 may receive sensor and targeting information transmitted from other teamed assets (e.g., from teamed UASs 142), generate graphical images associated with the sensor and targeting information, and output the graphical images to the augmented reality displays 412 and/or the virtual reality displays 414.

In some embodiments, the processor 402 may be configured to update the streams of image data such that a portion of content presented to the user is moved from the augmented reality displays 412 to the virtual reality displays 414. Similarly, the processor 402 may be configured to update the streams of image data such that a portion of content presented to the user is moved from the virtual reality displays 414 to the augmented reality displays 412. For example, the augmented reality displays 412 may have been displaying symbology while the virtual reality displays 414 displayed a virtual scene image, and the processor 402 may be configured to update the streams of image data such that a portion of symbology is moved from the augmented reality displays 412 to the virtual reality displays 414. In some embodiments, the processor 402 may be configured to update the streams of image data based at least in part on a predetermined relevance of information displayed, a predetermined priority of information displayed (e.g., relatively higher priority information may be displayed on the augmented reality displays 412 and relatively lower priority information may be displayed on the virtual reality displays 414), and/or on a received user input (e.g., a user voice command to move content, such as voice command to move a menu to the virtual reality displays 414).

For example, the processor 402 may be configured to generate and output streams of image data to the augmented reality displays 412 and/or the virtual reality displays 414 for presentation to the user. The image data may be associated with images aligned with the determined position and the determined orientation of the head of the user relative to the environment, and the images may include any of various assets and battlespace features. For example, the images may include at least one user-selectable depiction of at least one unmanned vehicle (e.g., UAS 142). The processor 402 may be configured to receive user input data from the user input system (e.g., the eye tracking system 410 and/or the voice recognition system 420), wherein the user input data includes user selection data associated with a selected unmanned vehicle of the at least one unmanned vehicle. Additionally, the processor 402 may be configured to update one or more of the streams of image data associated with the images such that the images further include a depiction of information associated with the selected unmanned vehicle. For example, the depiction of information associated with the selected unmanned vehicle may include a depiction of sensor feed data captured by at least one sensor of the selected unmanned vehicle. Additionally, for example, the information associated with the selected unmanned vehicle may include information of at least one of status, tasks, or capabilities of the selected unmanned vehicle.

The processor 402 may be configured to receive user input data from the user input system. For example, the user input data may include users selection data associated with user selections of various assets or battlespace features. Additionally, the user input data may include user command data associated with various user commands. For example, the user input data may include user command data associated with a command to control or manage a selected unmanned vehicle.

In some embodiment, the image data that the processor 402 outputs to the augmented reality displays 412 and/or the virtual reality displays 414 is battlespace image data associated with images of a battlespace. For example, the images of the battlespace may include depiction of battlespace features and assets. For example, the images associated with the image data may include user-selectable depictions of battlespace objects, and the processor 402 may receive user selection data associated with a selected battlespace object of the battlespace objects. In response to receiving the user selection data, the processor 402 may update the streams of image data associated with the images such that the images further include a depiction of information associated with the selected battlespace object. Additionally, for example, the processor 402 may receive user command data associated with a command to surveil the selected battlespace object, and the processor 402 may output a command to control or manage a particular unmanned vehicle to surveil the selected battlespace object. Further, for example, the processor 402 may receive user command data associated with a command to attack the selected battlespace object, and the processor 402 may output a command to control a particular unmanned vehicle to attack the selected battlespace object. In some embodiments, each user-selectable depiction of a battlespace object includes graphical information indicative of whether each battlespace object is classified as friendly, neutral, enemy, or unknown threat. For example, where the selected battlespace object is currently classified as unknown threat, the processor 402 may receive user command data associated with a command to classify the selected battlespace object, and the processor 402 may output a command to classify the selected battlespace object as friendly, neutral, or enemy.

In some embodiments, the processor 402 may be configured to receive real images as real image data from the cameras 418. The processor 108 may be configured to generate graphical images (e.g., symbology, text, and/or depictions), which, for example, may represent teamed assets and battlespace features, and overlay (e.g., via the augmented reality displays 412) the graphical images on the real image data displayed by the virtual reality displays 414.

In some embodiments, the at least one processor 402 may be implemented as a plurality of processors, such as at least one general purpose processor and at least one image processor. The processor 402 may be configured to run various software applications or computer code stored in a non-transitory computer-readable medium (e.g., memory 404 and/or storage device 406) and configured to execute various instructions or operations. The processor 402 may be implemented as a special purpose processor configured to execute instructions for performing any or all of the operations disclosed throughout.

Figure 6:
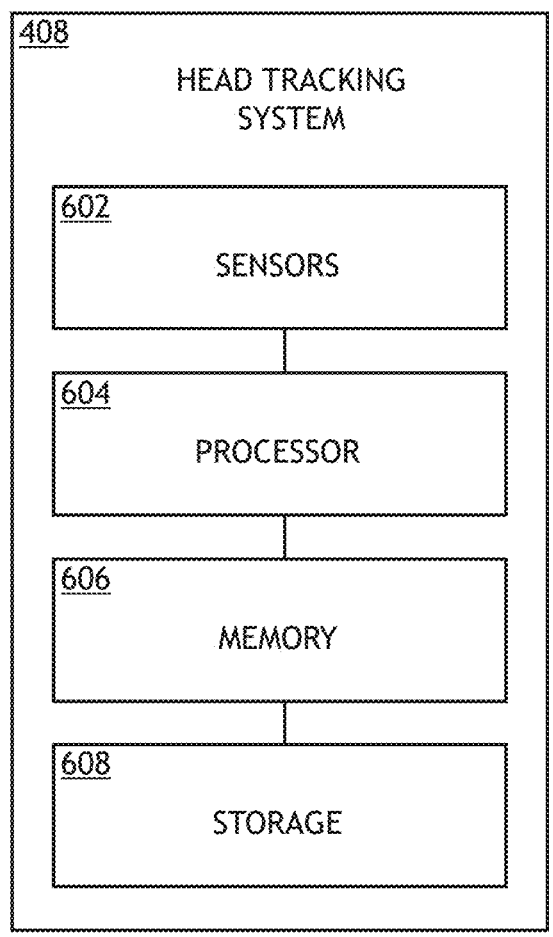
FIG. 6 is a view of the head tracking system of the head wearable device of FIG. 4 according to the inventive concepts disclosed herein.

The head tracking system 408 may be configured to determine and track a position and an orientation of a user's head relative to an environment. The head tracking system 408 may be configured to determine the position and orientation of the user's head relative to the environment at least in part based on information obtained from the flight dynamic sensors 310 and/or the inertial measurement unit 302; for example, the head tracking system 408 may be configured to account for (e.g., subtract out) acceleration caused by aircraft 102 motion. The head tracking system 408 may be configured for performing fully automatic head tracking operations in real time. As shown in FIG. 6, the head tracking system 408 may include sensors 602, a processor 604, memory 606, and storage 608, as well as other components, equipment, and/or devices commonly included in a head tracking system. The sensors 602, the processor 604, the memory 606, and the storage 608, as well as the other components, equipment, and/or devices commonly included in a head tracking system may be communicatively coupled.

The processor 604 of the head tracking system 408 may be configured to process data received from the sensors 602 and output processed data to one of the computing devices 112 and/or the processor 402 for use in generating images aligned with the user's field of view. For example, the processor 604 may be configured to determine and track a position and orientation of a user's head relative to an environment. Additionally, for example, the processor 604 may be configured to generate position and orientation data associated with such determined information and output the generated position and orientation data to one of the computing devices 112 and/or the processor 402. The processor 604 of the head tracking system 114 may be configured to run various software applications or computer code stored in a non-transitory computer-readable medium and configured to execute various instructions or operations. The processor 604 may be implemented as a special purpose processor configured to execute instructions for performing any or all of the operations disclosed throughout.

Figure 5:
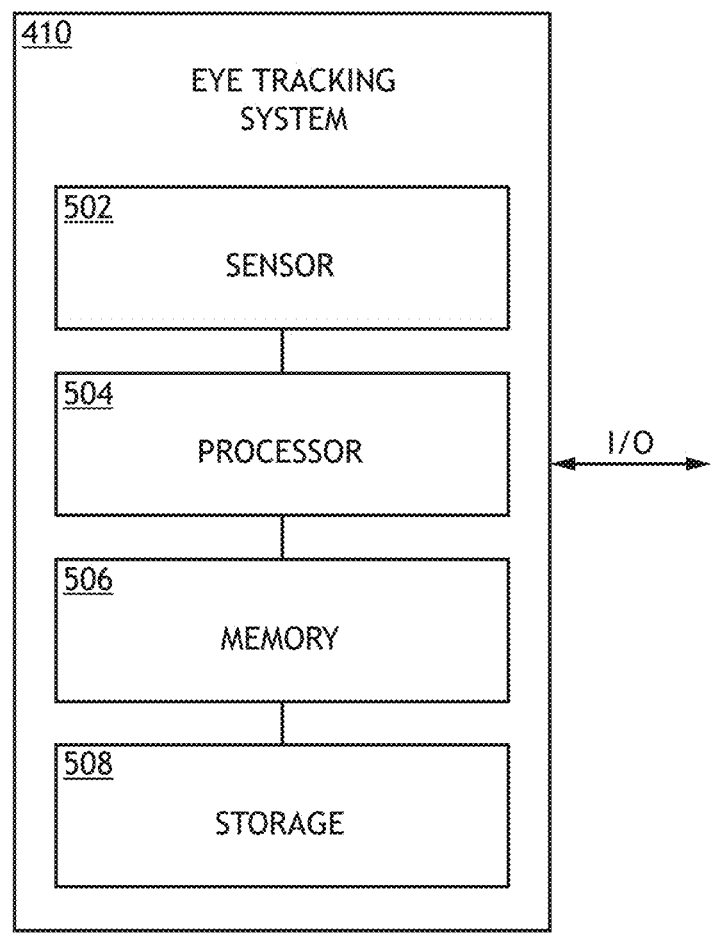
FIG. 5 is a view of the eye tracking system of the head wearable device of FIG. 4 according to the inventive concepts disclosed herein.

The eye tracking system 410 may be configured to track eye gestures, track movement of a user's eye, track a user's gaze, track scan patterns, determine a location of a vergence point (sometimes referred to as a point of regard) of a user's gaze, determine eye locations, track physiological metrics (e.g., blink rate, pupil dilation, time to first fixation, fixation length, and/or fixation count), determine an intra-pupillary distance (IPD) between a user's eyes, determine a direction between a determined location of a user's eye and a determined location of a vergence point for each of a user's eyes, and/or otherwise receive inputs from a user's eyes. The eye tracking system 410 may be configured for performing fully automatic eye tracking operations of users in real time. The eye tracking system 410 may include at least one sensor 502, at least one processor 504, memory 506, and storage 508, as shown in FIG. 5, as well as other components, equipment, and/or devices commonly included in an eye tracking system. The sensor 502, the processor 504, the memory 506, and the storage 508, as well as the other components, equipment, and/or devices commonly included in an eye tracking system may be communicatively coupled.

The eye tracking system 410 may be used as a cursor control device to select virtual content displayed on the augmented reality displays 412 and/or the virtual reality displays 414. For example, the eye tracking system 410 can be used to select teamed assets in the battlespace, or select items from a virtual menu. The eye tracking system 410 may also be used to trace the user's scan patterns, and alert the user of critical information which has been overlooked.

The processor 504 of the eye tracking system 410 may be configured to process data received from the sensor 502 and output processed data to the processor 402 and/or one of the computing devices 112. For example, the processor 504 may be configured to determine a location of a vergence point of a user's gaze, determine eye locations, determine an intra-pupillary distance (IPD) between a user's eyes, and/or determine a direction between a determined location of a user's eye and a determined location of a vergence point for each of a user's eyes. Additionally, for example, the processor 504 may be configured to generate data associated with such determined information and output the generated data to the processor 402 and/or one of the computing devices 112. The processor 504 of the eye tracking system 410 may be configured to run various software applications or computer code stored in a non-transitory computer-readable medium and configured to execute various instructions or operations. The processor 504 may be implemented as a special purpose processor configured to execute instructions for performing any or all of the operations disclosed throughout.

The speaker 416 may be configured to receive audio content associated with an environment and to present the audio content as audio to a wearing user of the head wearable device 140. Additionally, while the speaker 416 is depicted as a single speaker, the speaker 416 may be implemented as a plurality of speakers, such as one speaker for each ear of a user.

The cameras 416 may be configured to capture real images (e.g., real scene images) of a wearing user's field of view. The cameras' 416 field of view may align with a wearing user's field of view. The cameras 416 may be configured to output the real images as real image data (e.g., real scene image data) to one of the computing devices 112 and/or the processor 402. The cameras 416 may be configured to output a stream of real images as a stream of real image data to one of the computing devices 112 and/or the processor 402. The cameras 416 may be implemented as high resolution cameras. The cameras 416 may provide, to one of the computing devices 112 and/or the processor 402, stereoscopic images of the outside world when the user's view is blocked completely (e.g., blocked by the VR displays 414). For example, the processor 402 may augment the stereoscopic images with virtual graphics to generate virtual reality images to be presented on the VR displays 414. In some embodiments, the cameras 416 may be implemented as a single camera or two or more cameras.

The voice recognition system 418 may include at least one microphone 702, at least one processor 704, memory 706, and storage 708, as shown in FIG. 7, as well as other components, equipment, and/or devices commonly included in a voice recognition system. The microphone 702, the processor 704, the memory 706, and the storage 708, as well as the other components, equipment, and/or devices commonly included in an eye tracking system may be communicatively coupled. The voice recognition system 418 may be configured to recognize voice commands or audible inputs of a user. The voice recognition system 418 may allow the user to use verbal commands as an interaction and control method. The voice recognition system 418 may be configured to detect user commands and output user command data. Additionally, verbal commands may be used to modify, manipulate, and declutter content displayed by the head wearable device 140. The voice recognition system 418 may be integrated with the eye tracking system 410 so context of user inputs can be inferred. For example, while looking at a particular UAS 142, the user can say, "Turn to intercept", and one of the processors (e.g., 402, 602, and/or 704) may determine, based at least one the eye tracking data, that the user is implying that the command is intended for the particular UAS 142 without saying the particular UAS 142's call sign. The processor 704 may be configured to process data received from the microphone 702 and output processed data (e.g., text data) to one of the computing devices 112 and/or the processor 402. The processor 704 may be configured to run various software applications or computer code stored in a non-transitory computer-readable medium and configured to execute various instructions or operations.

While the processor 402, the memory 404, the storage device 406, the head tracking system 408, the user input system (e.g., the eye tracking system 410 and/or the voice recognition system 420), the augmented reality displays 412, the virtual reality displays 414, the speaker 416, and the cameras 418 of the head wearable device 140 have been exemplarily depicted as being implemented as separate devices or subsystems, in some embodiments, some or all of the processor 402, the memory 404, the storage device 406, the head tracking system 408, the user input system (e.g., the eye tracking system 410 and/or the voice recognition system 420), the augmented reality displays 412, the virtual reality displays 414, the speaker 416, and the cameras 418 may be implemented as a single integrated system or device or as any number of integrated and/or partially integrated subsystems and/or devices.

While the head wearable device 140 exemplarily includes elements as shown, in some embodiments, one or more of the elements of the head wearable device 140 may be omitted, or the head wearable device 140 may include other elements.

Figure 8:
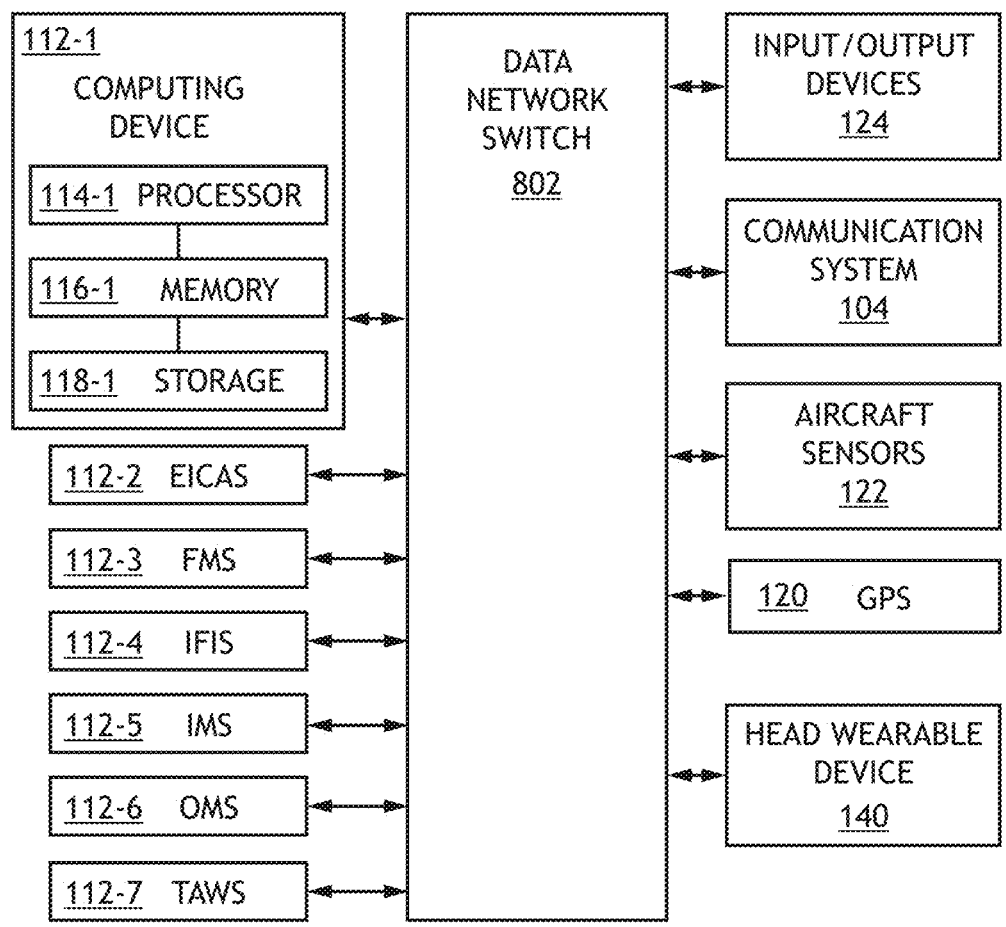
FIG. 8 is a view of exemplary devices of the aircraft of FIG. 1 communicatively coupled via a data network switch according to the inventive concepts disclosed herein.

Referring now to FIG. 8, various exemplary devices of the aircraft 102 of FIG. 1 communicatively coupled via a data network switch 802 (e.g., an avionics full-duplex Ethernet (AFDX) switch) are shown. For example, a plurality of computing devices 112 (e.g., avionics computing devices), the input/output devices 124, the communication system 104, vehicular sensors (e.g., the aircraft sensors 122), the GPS device 120, and the head wearable device 140 may be communicatively coupled via the data network switch 802. Each of the plurality of avionics computing devices (e.g., 112-1, 112-2, 112-3, 112-4, 112-5, 112-6, 112-7), the input/output devices 124, the communication system 104, vehicular sensors (e.g., the aircraft sensors 122), the GPS device 120, and the head wearable device 140 may be configured to exchange (e.g., send and/or receive) avionics data with one another via the data network switch 802. While the plurality of computing devices 112, the input/output devices 124, the communication system 104, the aircraft sensors 122, the GPS device 120, and the head wearable device 140 are exemplarily shown as being communicatively coupled via the data network switch 802, in some embodiments some or all of the plurality of computing devices 112, the input/output devices 124, the communication system 104, the vehicular sensors (e.g., the aircraft sensors 122), the GPS device 120, and the head wearable device 140 may be communicatively coupled via any suitable data networks and via any suitable data networking components (e.g., at least one bus (e.g., Aeronautical Radio, Incorporated (ARINC) 429 busses), at least one data concentrator, at least one switch, at least one router, or a combination thereof).

The plurality of computing devices 112 may be implemented as and/or include a plurality of vetronics computing devices, such as a plurality of avionics computing devices (e.g., which may be implemented in one or more integrated modular avionics (IMA) cabinets). The plurality of avionics computing devices may include a first avionics computing device 112-1, a crew alerting system (CAS) computing device (e.g., an engine indication and crew alerting system (EICAS) computing device 112-2), a flight management system (FMS) computing device 112-3, an integrated flight information system (IFIS) computing device 112-4, an information management system (IMS) computing device 112-5, an onboard maintenance system (OMS) computing device 112-6, a terrain awareness and warning system (TAWS) computing device 112-7, a secure server router computing device (not shown), an automatic dependent surveillance (ADS) computing device (not shown), and a traffic collision avoidance system (TCAS) computing device (not shown), as well as other avionics computing devices commonly implemented in an aircraft. Additionally, the input/output devices 124, the communication system 104, the aircraft sensors 122, the data network switch 802, and the GPS device 120 may be considered to be devices of the plurality of avionics computing devices and may be implemented similarly as and function similarly as avionics devices (e.g., 112-1, 112-2, 112-3, 112-4, 112-5, 112-6, 112-7) as disclosed throughout. Each of the plurality of avionics computing devices (e.g., 112-1, 112-2, 112-3, 112-4, 112-5, 112-6, 112-7, 112-8) may include components, which may be implemented and function similarly as the components of the computing device 112 shown and described with respect to FIG. 1. As such, each of the plurality of avionics computing devices may include at least one processor, memory, and storage, which may be implemented and function similarly as the processor 114, the memory 116, and the storage 118, respectively, of the computing device 112 shown and described with respect to FIG. 1. For example, the first avionics computing device 112-1 may include a processor 114-1, memory 116-1, and storage 118-1, which may be implemented and function similarly as the processor 114, the memory 116, and the storage 118, respectively, of the computing device 112 shown and described with respect to FIG. 1.

The plurality of avionics computing devices (e.g., 112-1, 112-2, 112-3, 112-4, 112-5, 112-6, 112-7) and/or processors thereof (e.g., 114-1) may be implemented as special purpose computers (e.g., the first avionics computing device 112-1, the EICAS computing device 112-2, the FMS computing device 112-3, the IFIS computing device 112-4, the IMS computing device 112-5, the OMS computing device 112-6, the TAWS computing device 112-7) and/or special purpose processors (e.g., the processor 114-1 of the first avionics computing device 112-1 programmed to execute instructions for operations as disclosed throughout, a processor of the EICAS computing device 112-2 programmed to execute instructions for performing EICAS operations as disclosed throughout, a processor of the FMS computing device 112-3 programmed to execute instructions for performing FMS operations as disclosed throughout, a processor of the IFIS computing device 112-4 programmed to execute instructions for performing IFIS operations as disclosed throughout, a processor of the IMS computing device 112-5 programmed to execute instructions for performing IMS operations as disclosed throughout, a processor of the OMS computing device 112-6 programmed to execute instructions for performing OMS operations as disclosed throughout, a processor of the TAWS computing device 112-7 programmed to execute instructions for performing TAWS operations as disclosed throughout) configured to execute instructions for performing any or all of the operations disclosed throughout.

Additionally, in some embodiments, the data network switch 802 may be implemented similarly as and function similarly to one of the avionics computing devices (e.g., 112-1, 112-2, 112-3, 112-4, 112-5, 112-6, 112-7) or include components that function similarly to components of one of the avionics computing devices. For example, the data network switch 802 may include an integrated computing device (which may be implemented and function similarly to one of the computing devices 112 (e.g., one of the avionics computing devices (e.g., 112-1, 112-2, 112-3, 112-4, 112-5, 112-6, 112-7))) and/or integrated computing device components (which may be implemented and function similarly to components of one of the computing devices 112 of FIG. 1).

Further, while the plurality of avionics computing devices has been exemplarily depicted and described with respect to FIG. 8 as including the first avionics computing device 112-1, the EICAS computing device 112-2, the FMS computing device 112-3, the IFIS computing device 112-4, the IMS computing device 112-5, the OMS computing device 112-6, and the TAWS computing device 112-7, in some embodiments, the plurality of avionics computing devices may omit one or more of the described and depicted avionics computing devices, include additional numbers of such avionics computing devices, and/or include other types of suitable avionics computing devices.

Figure 9:
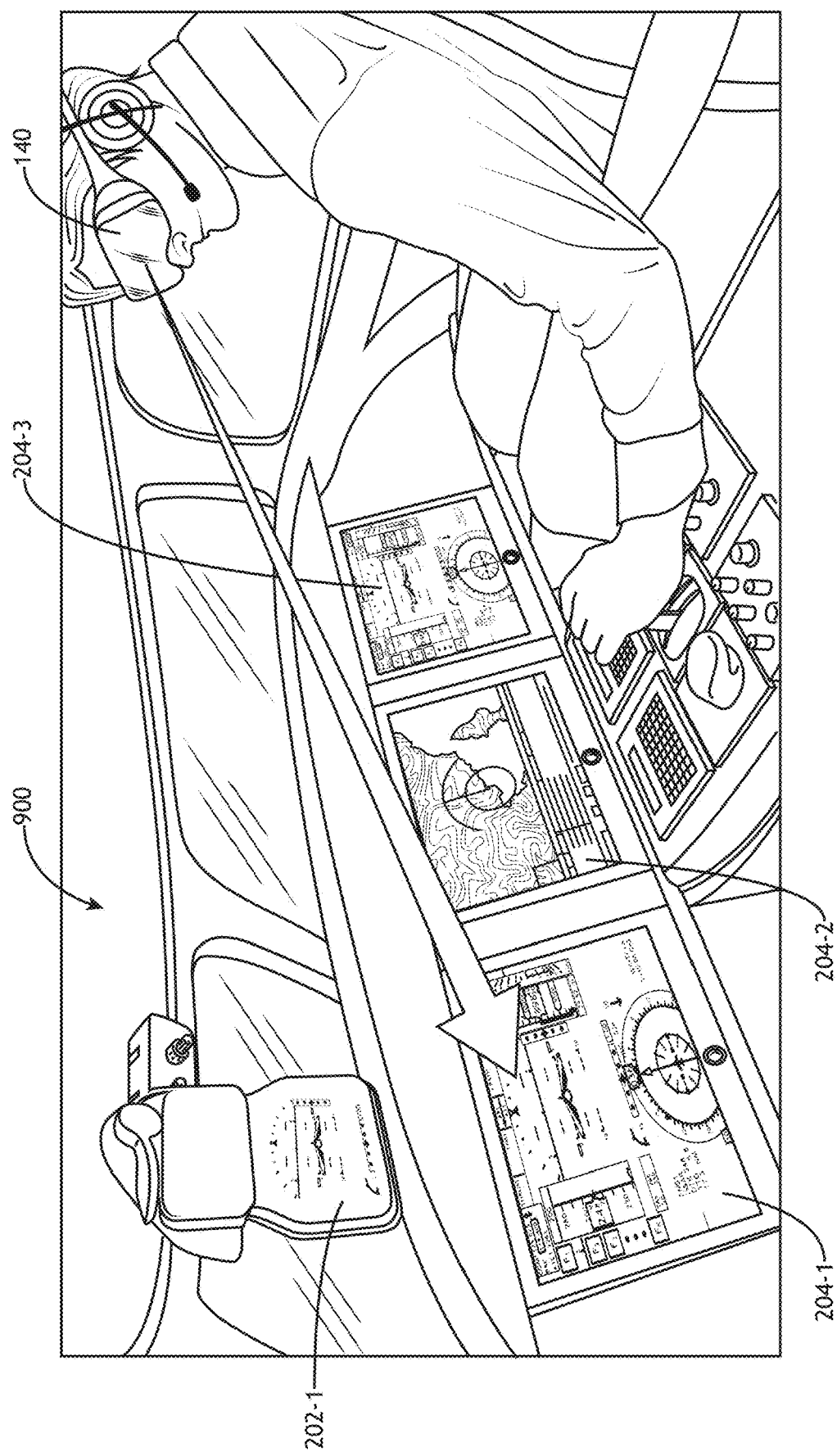
FIG. 9 is a view of a pilot wearing the head wearable device in a cockpit of the aircraft of FIG. 1 according to the inventive concepts disclosed herein.

Referring now to FIG. 9, a pilot wearing the head wearable device 140 in a cockpit 900 of the aircraft 102 of FIG. 1 is shown. Content displayed by the head wearable device 140 and content displayed by one or more of displays (e.g., HDD 204-1, HDD 204-2, HDD 204-3 and/or HUD 202-1) of the cockpit 900 may be synched. In some embodiments, the content displayed by the head wearable device 140 and the content displayed by one or more of displays of the cockpit 900 provide a seamless transition between what virtual content the pilot is seeing on the head wearable device 140 and the HDDs 204-1, 204-2, 204-3. In some embodiments, one of the HDDs 204 may display a menu with user-selectable options to filter what content is displayed on the augmented reality displays 412 and/or the virtual reality displays 414 of the head wearable device 140. For example, the HDD menu may provide user-selectable modes for the pilot to declutter content such as friendly forces, enemy forces, ground assets, air assets, engagement areas, and/or sensor and weapon ranges, for example, based on the pilot's preference. Additionally, the head wearable device 140 and the HDDs 204 may offer complementary features so that the operator can easily switch between head-up and head down operations. For example, when an object or asset is selected on the head wearable device 140 or one of the HDDs 204, the selected object or asset may also be highlighted to the pilot on the other display device. Additionally, for example, when the pilot directs a scenario or commands an asset depicted by the head wearable device 140, a corresponding change may be displayed on one of the HDDs 204, and vice-a-versa. Further, for example, if the pilot selects an asset's sensor feed, targeting feed, or video feed via the head wearable device 140, one of the HDDs 204 may display a magnified or enlarged version of the selected feed. Similarly, if the pilot selects a feed via one of the HDDs 204, the head wearable device 140 may show that feed on the head wearable device 140.

Figure 10:
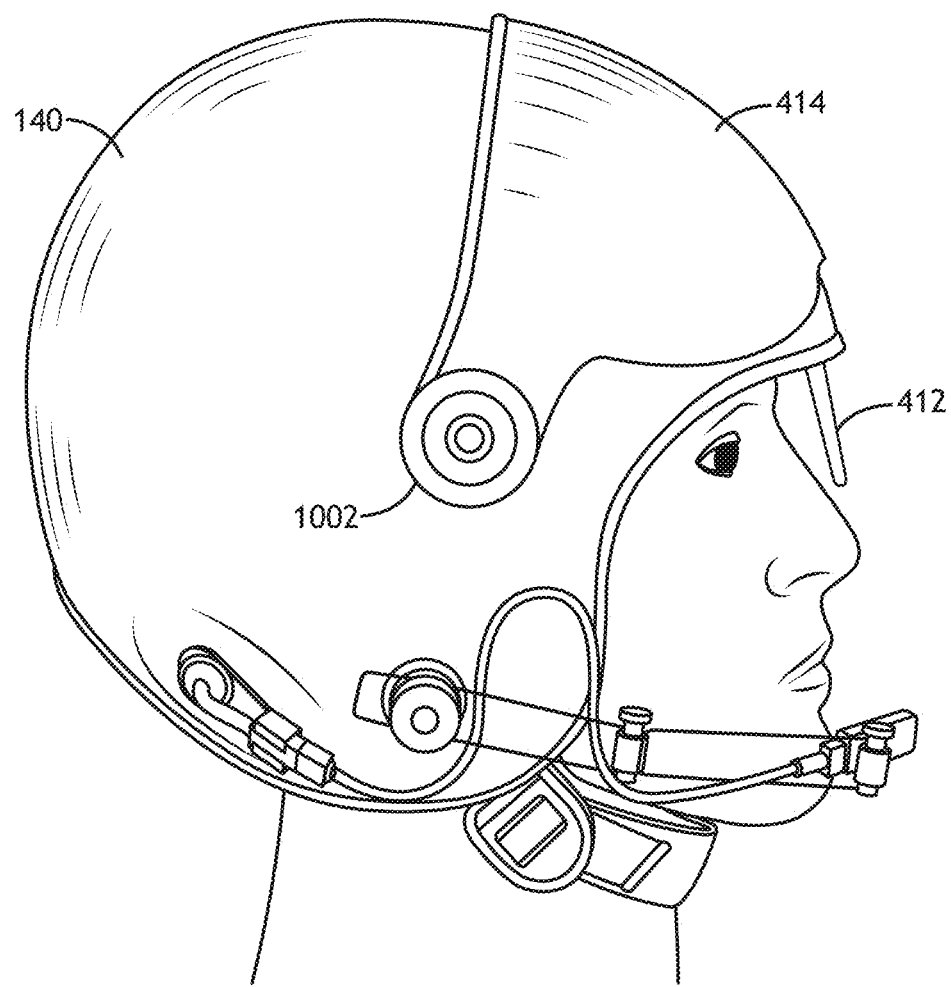
FIG. 10 is a view of an exemplary embodiment of the head wearable device of FIGS. 1 and 4 according to the inventive concepts disclosed herein.
Figure 11:
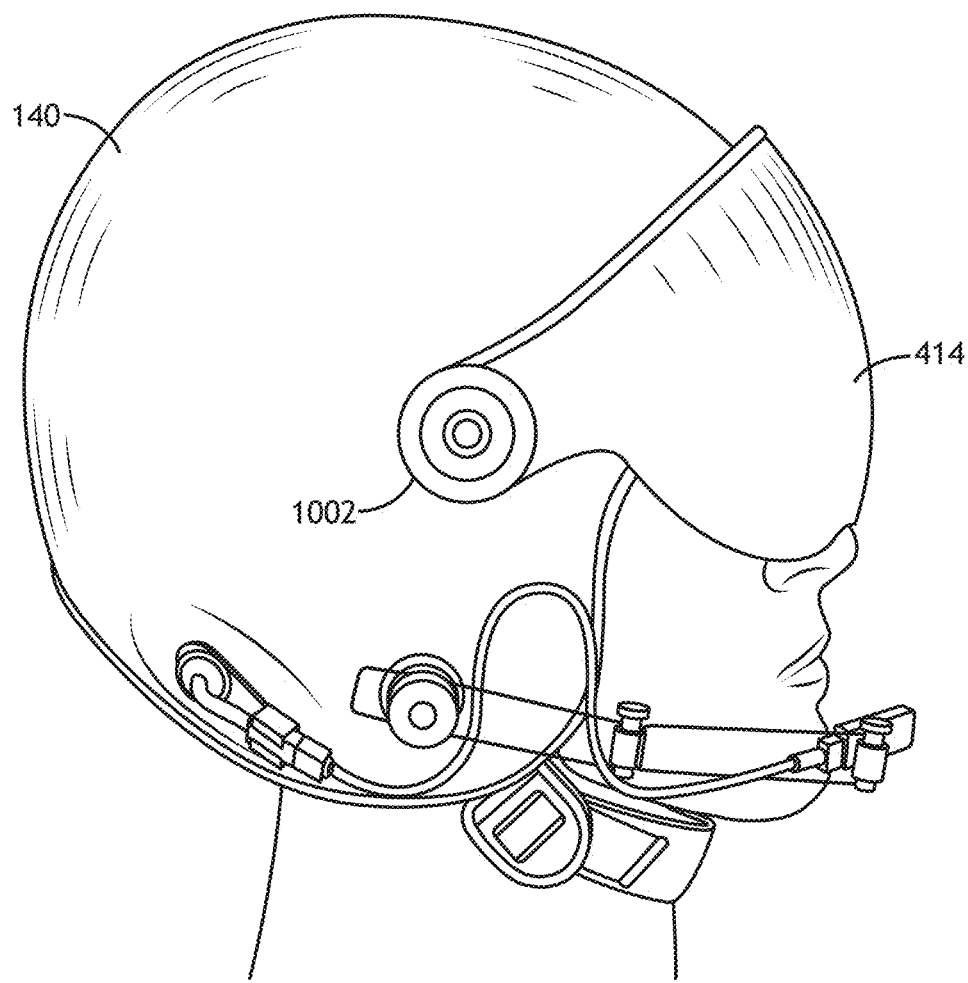
FIG. 11 is an additional view of the head wearable device of FIG. 10 according to the inventive concepts disclosed herein.

Referring now to FIGS. 10-11, an exemplary embodiment of the head wearable device 140 according to the inventive concepts disclosed herein is shown. The augmented reality displays 412 may be fixed in front of the eyes of the user of the head wearable device 140. The virtual reality displays 414 may be configured to move relative to the remainder of the head wearable device 140 between a first position and a second position. For example, the virtual reality displays 414 may move between positions by pivoting about a pivot attachment 1002. When the virtual reality displays 414 are in the first position (as shown in FIG. 11), the augmented reality displays 412 and the virtual reality displays 414 may be configured to simultaneously present aligned content having perceptible depth to the user. When the virtual reality displays 414 are in the first position, the virtual reality displays 414 may be considered to be occluded displays that block light from the real world from being perceived by the user such that the only significant light that the user perceives is from the virtual reality displays 414. When the virtual reality displays 414 are in the second position (as shown in FIG. 10), the augmented reality displays 412 may be configured to present content to the user while allowing the user to view a real world environment outside of the head wearable device 140 through the augmented reality displays 412.

Referring now to FIG. 12, an exemplary view of the augmented reality displays 412 and the virtual reality displays 414 of the head wearable device 140 according to the inventive concepts disclosed herein is shown. As shown in FIG. 12, left and right virtual reality displays 414-1, 414-2 are in the first position (as shown in FIG. 11), and left and right augmented reality displays 412-1, 412-2 and the left and right virtual reality displays 414-1, 414-2 simultaneously stereoscopically present aligned content having perceptible depth to the user. For example, the left and right augmented reality displays 412-1, 412-2 may present augmented reality images, such as symbology (as shown), which appears in the foreground and is overlaid on top of virtual reality images displayed by the left and right virtual reality displays 414-1, 414-2. For example, the left and right virtual reality displays 414-1, 414-2 may display virtual reality images, such as a virtual view of the world, which appears in the background as compared to the augmented reality images.

Figure 13:
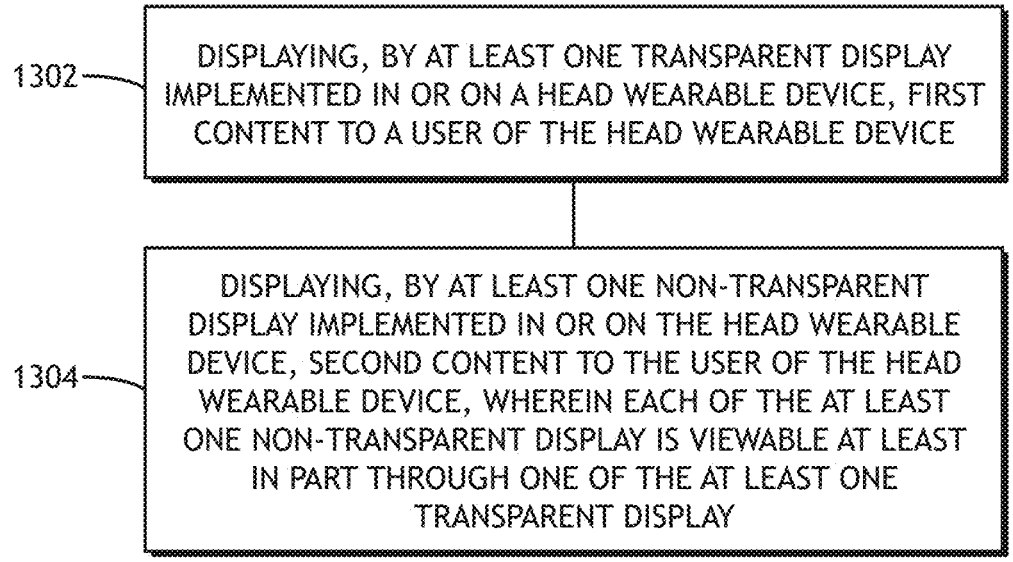
FIG. 13 is a diagram of an exemplary embodiment of a method according to the inventive concepts disclosed herein.

Referring now to FIG. 13, an exemplary embodiment of a method 1300 according to the inventive concepts disclosed herein may include one or more of the following steps. Additionally, for example, some embodiments may include performing one more instances of the method 1300 iteratively, concurrently, and/or sequentially. Additionally, for example, at least some of the steps of the method 1300 may be performed in parallel and/or concurrently. Additionally, in some embodiments, at least some of the steps of the method 1300 may be performed non-sequentially.

A step 1302 may include displaying, by at least one transparent display implemented in or on a head wearable device, first content to a user of the head wearable device.

A step 1304 may include displaying, by at least one non-transparent display implemented in or on the head wearable device, second content to the user of the head wearable device, wherein each of the at least one non-transparent display is viewable at least in part through one of the at least one transparent display.

Further, the method may include any of the operations disclosed throughout.

As will be appreciated from the above, embodiments of the inventive concepts disclosed herein may be directed to a method, a system, and at least one head wearable device.

As used throughout and as would be appreciated by those skilled in the art, "at least one non-transitory computer-readable medium" may refer to as at least one non-transitory computer-readable medium (e.g., memory 110, memory 116, memory 212, memory 404, memory 506, memory 606, memory 706, memory 116-1, storage 118, storage 214, storage 406, storage 508, storage 608, storage 708, storage 118-1, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A head wearable device, comprising:
   at least one transparent display implemented in or on the head wearable device, the at least one transparent display configured to present first content to a user of the head wearable device;
   at least one non-transparent display implemented in or on the head wearable device, the at least one non-transparent display configured to present second content to the user of the head wearable device, wherein each of the at least one non-transparent display is viewable at least in part through one of the at least one transparent display; and
   at least one processor communicatively coupled to the at least one transparent display and the at least one non-transparent display, the at least one processor configured to:
   output streams of image data to the at least one transparent display and the at least one non-transparent display for presentation to the user as the first content and the second content.

2. The head wearable device of claim 1, wherein the at least one transparent display is implemented as at least one augmented reality display, wherein the at least one non-transparent display is implemented as at least one virtual reality display.

3. The head wearable device of claim 2, wherein the at least one non-transparent display is further configured to present at least one of a synthetic or a sensed view of an environment of the user.

4. The head wearable device of claim 1, wherein the at least one transparent display comprises a left transparent display and a right transparent display, wherein the at least one non-transparent display comprises a left non-transparent display and a right non-transparent display, wherein the left transparent display and the right transparent display are configured to present first stereoscopic content to the user, wherein the left non-transparent display and the right non-transparent display are configured to present second stereoscopic content to the user.

5. The head wearable device of claim 1, wherein the at least one non-transparent display is configured to move relative to the head wearable device between a first position and a second position.

6. The head wearable device of claim 5, wherein, when the at least one non-transparent display is in the first position, the at least one transparent display and the at least one non-transparent display are configured to simultaneously present aligned content having perceptible depth to the user.

7. The head wearable device of claim 6, wherein, when the at least one non-transparent display is in the second position, the at least one transparent display is configured to present the first content to the user while allowing the user to view a real world environment outside of the head wearable device through the at least one transparent display.

8. The head wearable device of claim 7, wherein, when the at least one non-transparent display is in the first position, the at least one non-transparent display is powered on, wherein, when the at least one non-transparent display is in the second position, the at least one non-transparent display is not used.

9. The head wearable device of claim 1, wherein the at least one processor is further configured to:
   receive data from a vetronics computing device; and
   based at least on the received data, generate the streams of the image data.

10. The head wearable device of claim 1, wherein the at least one processor is further configured to:
    receive data from an avionics computing device; and
    based at least on the received data, generate the streams of the image data.

11. The head wearable device of claim 1, wherein the at least one processor is further configured to:
    receive data from at least one of an unmanned or another manned vehicle; and
    based at least on the received data, generate the streams of the image data.

12. The head wearable device of claim 11, wherein the at least one non-transparent display is further configured to present a virtual view from a perspective of at least one of the unmanned vehicle or the other manned vehicle.

13. The head wearable device of claim 1, further comprising at least one camera mounted on the head wearable device, the at least one camera communicatively coupled with the at least one processor, wherein the at least one processor is further configured to:
  receive video data from the at least one camera; and
  based at least on the video data, generate the streams of the image data.

14. The head wearable device of claim 1, wherein the at least one processor is further configured to:
  update the streams of image data such that a portion of the first content presented to the user is moved from the at least one transparent display to the at least one non-transparent display.

15. The head wearable device of claim 1, wherein the at least one processor is further configured to:
  update the streams of image data such that a portion of the second content presented to the user is moved from the at least one non-transparent display to the at least one transparent display.

16. The head wearable device of claim 1, further comprising a head tracking system implemented in or on the head wearable device, the head tracking system communicatively coupled to the at least one processor, the head tracking system configured to:
  determine a position and an orientation of a head of the user of the head wearable device relative to an environment; and
  output position and orientation data associated with the determined position and the determined orientation of the head of the user relative to the environment;
  wherein the streams of the image data are associated with images aligned with the determined position and the determined orientation of the head of the user relative to the environment.

17. The head wearable device of claim 16, further comprising a user input system comprising at least one of an eye tracking system or a voice recognition system, the user input system communicatively coupled to the at least one processor, the user input system configured to:
  detect user inputs of the user of the head wearable device; and
  output user input data;
  wherein the images include at least one user-selectable depiction, wherein the at least one processor is further configured to:
  receive the user input data from the user input system, wherein the user input data includes user selection data associated with a selected user-selectable depiction of the at least one user-selectable depiction; and
  update the streams of image data associated with the images such that the images further include a depiction of information associated with the selected user-selectable depiction.

18. A method, comprising:
  displaying, by at least one transparent display implemented in or on a head wearable device, first content to a user of the head wearable device;
  displaying, by at least one non-transparent display implemented in or on the head wearable device, second content to the user of the head wearable device, wherein each of the at least one non-transparent display is viewable at least in part through one of the at least one transparent display; and
  outputting, by at least one processor communicatively coupled to the at least one transparent display and the at least one non-transparent display, streams of image data to the at least one transparent display and the at least one non-transparent display for presentation to the user as the first content and the second content.

19. A system, comprising:
  a computing device comprising a processor; and
  a head wearable device communicatively coupled to the computing device, the head wearable device comprising:
    at least one transparent display implemented in or on the head wearable device, the at least one transparent display configured to present first content to a user of the head wearable device;
    at least one non-transparent display implemented in or on the head wearable device, the at least one non-transparent display configured to present second content to the user of the head wearable device, wherein each of the at least one non-transparent display is viewable at least in part through one of the at least one transparent display; and
    at least one processor communicatively coupled to the at least one transparent display and the at least one non-transparent display, the at least one processor configured to:
      output streams of image data to the at least one transparent display and the at least one non-transparent display for presentation to the user as the first content and the second content.

20. A head wearable device, comprising:
  at least one transparent display implemented in or on the head wearable device, the at least one transparent display configured to present first content to a user of the head wearable device; and
  at least one non-transparent display implemented in or on the head wearable device, the at least one non-transparent display configured to present second content to the user of the head wearable device, wherein each of the at least one non-transparent display is viewable at least in part through one of the at least one transparent display,
  wherein the at least one transparent display is implemented as at least one augmented reality display, wherein the at least one non-transparent display is implemented as at least one virtual reality display.

21. A head wearable device, comprising:
  at least one transparent display implemented in or on the head wearable device, the at least one transparent display configured to present first content to a user of the head wearable device; and
  at least one non-transparent display implemented in or on the head wearable device, the at least one non-transparent display configured to present second content to the user of the head wearable device, wherein each of the at least one non-transparent display is viewable at least in part through one of the at least one transparent display,
  wherein the at least one transparent display comprises a left transparent display and a right transparent display, wherein the at least one non-transparent display comprises a left non-transparent display and a right non-transparent display, wherein the left transparent display and the right transparent display are configured to present first stereoscopic content to the user, wherein the left non-transparent display and the right non-transparent display are configured to present second stereoscopic content to the user.

22. A head wearable device, comprising:
  at least one transparent display implemented in or on the head wearable device, the at least one transparent display configured to present first content to a user of the head wearable device; and at least one non-transparent display implemented in or on the head wearable device, the at least one non-transparent display configured to present second content to the user of the head wearable device, wherein each of the at least one non-transparent display is viewable at least in part through one of the at least one transparent display, wherein the at least one non-transparent display is configured to move relative to the head wearable device between a first position and a second position.

* * * * *